United States Patent
Ugurlu et al.

(10) Patent No.: US 10,708,025 B2
(45) Date of Patent: Jul. 7, 2020

(54) MANAGING REFERENCE SIGNALS IN A WIRELESS COMMUNICATION NETWORK

(71) Applicant: Telefonaktiebolaget LM Ericsson (publ), Stockholm (SE)

(72) Inventors: Umut Ugurlu, Espoo (FI); Rui Fan, Beijing (CN); Qingyu Miao, Beijing (CN); Edgar Ramos, Kirkkonummi (FI); Hai Wang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 659 days.

(21) Appl. No.: 15/506,839

(22) PCT Filed: Dec. 20, 2016

(86) PCT No.: PCT/CN2016/111004
§ 371 (c)(1),
(2) Date: Feb. 27, 2017

(87) PCT Pub. No.: WO2018/112735
PCT Pub. Date: Jun. 28, 2018

(65) Prior Publication Data
US 2019/0273583 A1 Sep. 5, 2019

(51) Int. Cl.
*H04L 5/00* (2006.01)
*H04W 36/00* (2009.01)
(Continued)

(52) U.S. Cl.
CPC ........... *H04L 5/005* (2013.01); *H04B 7/0408* (2013.01); *H04B 7/0695* (2013.01);
(Continued)

(58) Field of Classification Search
CPC . H04W 36/0085; H04W 24/10; H04W 36/04; H04B 7/0408; H04B 7/0695; H04L 5/005; H04L 5/0023; H04L 5/0098
See application file for complete search history.

(56) References Cited

U.S. PATENT DOCUMENTS

2017/0302355 A1\* 10/2017 Islam .................. H04B 7/0639
2019/0141589 A1\* 5/2019 Wei ................. H04W 36/00837

FOREIGN PATENT DOCUMENTS

CN 104918328 A 9/2015
CN 105393638 A 3/2016
(Continued)

OTHER PUBLICATIONS

Unknown, Author, "Final Report of 3GPP TSG RAN WG1 #84bis v1.0.0", 3GPP TSG RAN WG1 Meeting #85, R1-163961, Nanjing, China, MCC Support, May 23-27, 2016, 1-158.
(Continued)

*Primary Examiner* — Saad A. Waqas
(74) *Attorney, Agent, or Firm* — Murphy, Bilak & Homiller, PLLC

(57) ABSTRACT

There is provided a method for selectively enabling periodic transmission of reference signals in a wireless communication network. The method comprises obtaining (S1) information of user activity in one or more beams, cells or sector, and performing (S2) at least one of activating and deactivating, for at least one beam, cell or sector, periodic transmission of reference signals based on the obtained information.

13 Claims, 21 Drawing Sheets

(51) Int. Cl.
  *H04B 7/0408*    (2017.01)
  *H04B 7/06*      (2006.01)
  *H04W 24/10*     (2009.01)
  *H04W 36/04*     (2009.01)

(52) U.S. Cl.
  CPC .......... *H04L 5/0023* (2013.01); *H04L 5/0048* (2013.01); *H04L 5/0098* (2013.01); *H04W 24/10* (2013.01); *H04W 36/0085* (2018.08); *H04W 36/04* (2013.01)

(56) References Cited

FOREIGN PATENT DOCUMENTS

| | | |
|---|---|---|
| CN | 106060855 A | 10/2016 |
| RU | 2600569 C2 | 10/2016 |
| WO | 2010093297 A1 | 8/2010 |
| WO | 2016045695 A1 | 3/2016 |
| WO | 2016198123 A1 | 12/2016 |

OTHER PUBLICATIONS

Unknown, Author, "Report of 3GPP TSG RAN WG2 meeting #95", 3GPP TSG-RAN Working Group 2 meeting #95bis, R2-166054, Kaohsiung, ETSI MCC, Oct. 10-14, 2016, 1-210.

Unknown, Author, "Beam-based Aspects for New Radio", 3GPP TSG-RAN WG2 #96, R2-168466, InterDigital Communications, Reno, USA, Nov. 14-18, 2016, 4 pages.

Unknown, Author, "RRC Measurement Reporting in NR", 3GPP TSG-RAN WG2 Meeting #96, Tdoc R2-168718, Ericsson, Reno, Nevada, Nov. 14-18, 2016, 4 pages.

Unknown, Author, "RS for Beam Management", 3GPP TSG-RAN WG1 #87, R1-1612346, Ericsson, Reno, Nevada, Nov. 14-18, 2016, 4 pages.

* cited by examiner

MANAGING REFERENCE SIGNALS IN A WIRELESS COMMUNICATION NETWORK

TECHNICAL FIELD

The proposed technology generally relates to wireless communication networks, and the use of reference signals in such networks. In particular, the proposed technology concerns a method for selectively enabling periodic transmission of reference signals, a method for performing handover, a method of operating a wireless communication device, a corresponding network device, network node and wireless communication device, as well as corresponding computer programs and computer-program products, and apparatuses.

BACKGROUND

In general, it is desirable to obtain good performance and high capacity in wireless communication networks, and there are always on-going developments for improving and optimizing the network operation. However, many of these developments provide improved performance or useful functionality in some aspect, but may for example require additional resources, thereby leading to reduced performance in some other aspect.

For example, in legacy-based cellular communication networks such as networks operating according to the 3rd Generation Partnership Project (3GPP) Long Term Evolution (LTE) systems, reference signals are normally transmitted or broadcasted in an always-on manner, e.g. to allow wireless communication devices served by the network to perform measurements on neighbor cell candidates and send measurement reports to the network side. The reference signals are easy to measure and yield consistent results, but the static always-on signaling leads to a high network resource utilization, interference and energy consumption. The measurement reports may be sent by the wireless devices only when some specific criteria are fulfilled to avoid too many unnecessary reports. However, there is still a demand for improved solutions for managing reference signals and related measurements and reports.

In the 5th generation (5G) of mobile communications, although not yet fully defined, wireless access will be realized by the evolution of Long Term Evolution, LTE, for existing spectrum in combination with new radio access technologies that primarily target new spectrum. Thus it includes work on a so-called 5G New Radio (NR) Access Technology, also known as 5G. The NR air interface targets spectrum in the range from sub-1 GHz up to 100 GHz with initial deployments expected in frequency bands not utilized by LTE.

Due to the scarcity of available spectrum in the range of frequencies that have so far been used for wireless communication, spectrum located in very high frequency ranges, such as 10 GHz and above, are planned to be utilized for future mobile communication systems.

For such high frequency spectrum, the atmospheric penetration and diffraction attenuation properties can be much worse than for lower frequency spectrum. In addition, the receiver antenna aperture, as a metric describing the effective receiver antenna area that collects the electromagnetic energy from an incoming electromagnetic wave, is frequency dependent, i.e., the link budget would be worse for the same link distance even in a free space scenario, if omnidirectional receive and transmit antennas are used. This motivates the usage of beamforming to compensate for the loss of link budget in high frequency spectrum.

Hence, future communications networks are expected to use advanced antenna systems to a large extent. With such antennas, signals may be transmitted in narrow transmission beams to increase signal strength in some directions and/or to reduce interference in other directions. The beamforming will enable high data rate transmission coverage also to very distant users which would not realistically be covered with normal sector-wide beams, which have lower antenna gain. Beamforming may be used at the transmitter, at the receiver, or both. In a large part of the spectrum planned for 5G deployments, the preferred configuration is to use a large antenna array at the access node and a small number of antennas at the wireless device. The large antenna array at the access node enables high-order transmission beamforming in the downlink.

The procedure of sequentially transmitting the beam in all necessary directions is referred to as a beam sweep or beam scan. A beam sweep may involve a variable number of beams depending on the situation. Often, quite many beams may be required, especially when the candidate beams originate from multiple candidate access nodes.

The beam sweep may serve other purposes than just time and frequency synchronization; in particular, the sweep may also serve the purpose of determining the best beam direction for data transmission to the new wireless device. In such cases, the beam may as mentioned above contain some information (e.g. a reference symbol sequence) that uniquely identifies the beam, so that the wireless device can report to the access node, which beam that was best received. Such a reference signal is in 5G sometimes referred to as a Mobility Reference Signal, MRS or Beam Reference Signal, BRS.

In beamforming-based communication networks, it could also be beneficial to avoid always-on signaling. In fact, in 3GPP, it has been agreed that the transmission of so-called always-on signaling should be minimized.

Accordingly, there is still a general demand for solutions as to how to manage reference signals in an efficient manner.

SUMMARY

It is an object to provide a method for selectively enabling periodic transmission of reference signals in a wireless communication network.

Another object is to provide a method for performing handover between beams, cells or sectors.

It is also an object to provide a method of operating a wireless communication device in a wireless communication network.

Yet another object is to provide a network device configured for operation in connection with a wireless communication network.

Still another object is to provide a network node comprising such a network device.

It is also an object to provide a wireless communication device configured for operation in a wireless communication network.

Another object is to provide corresponding computer programs and computer-program products.

Yet another object is to provide an apparatus for selectively enabling transmission of reference signals in a wireless communication network.

Still another object is to provide an apparatus for handling measurements of reference signals in a wireless communication network.

These and other objects are met by embodiments of the proposed technology.

According to a first aspect, there is provided a method for selectively enabling periodic transmission of reference signals in a wireless communication network. The method comprises obtaining information of user activity in one or more beams, cells or sector, and performing at least one of activating and deactivating, for at least one beam, cell or sector, periodic transmission of reference signals based on the obtained information.

According to a second aspect, there is provided a method for performing handover between beams, cells or sectors comprising a method of the first aspect.

According to a third aspect, there is provided a method of operating a wireless communication device in a wireless communication network. The method comprises performing measurements of reference signals, which are periodically transmitted in dependence on user activity in one or more beams, cells or sectors, and transmitting a measurement report based on the performed measurements to the network side.

According to a fourth aspect, there is provided a network device configured for operation in connection with a wireless communication network. The network device is configured to obtain information of user activity in one or more beams, cells or sectors. The network device is also configured to perform at least one of activation and deactivation, for at least one beam, cell or sector, of periodic transmission of reference signals based on the obtained information.

According to a fifth aspect, there is provided a network node comprising a network device of the fourth aspect.

According to a sixth aspect, there is provided a wireless communication device configured for operation in a wireless communication network. The wireless communication device is configured to perform measurements of reference signals, which are periodically transmitted in dependence on user activity in one or more beams, cells or sectors. The wireless communication device is also configured to transmit a measurement report based on the performed measurements to the network side.

According to a seventh aspect, there is provided a computer program comprising instructions, which when executed by at least one processor, cause the at least one processor to:
  obtain information of user activity in one or more beams, cells or sectors; and
  perform at least one of activation and deactivation, for at least one beam, cell or sector, of periodic transmission of reference signals based on the obtained information.

According to an eighth aspect, there is provided a computer program comprising instructions, which when executed by at least one processor, cause the at least one processor to:
  initiate measurements of reference signals, which are periodically transmitted in dependence on user activity in one or more beams, cells or sectors; and
  prepare a measurement report based on the measurements of the periodically transmitted reference signals for transmission to the network side.

According to a ninth aspect, there is provided a computer-program product comprising a computer-readable medium having stored thereon a computer program of the eighth or ninth aspect.

According to a tenth aspect, there is provided an apparatus for selectively enabling transmission of reference signals in a wireless communication network. The apparatus comprises an obtaining module for obtaining information of user activity in one or more beams, cells or sectors. The apparatus also comprises an activating/deactivating module for performing at least one of activating and deactivating, for at least one beam, cell or sector, of periodic transmission of reference signals based on the obtained information.

According to an eleventh aspect, there is provided an apparatus for handling measurements of reference signals in a wireless communication network. The apparatus comprises an initiating module for initiating measurements of reference signals, which are periodically transmitted in dependence on user activity in one or more beams, cells or sectors. The apparatus also comprises a report module for preparing a measurement report based on the measurements of the periodically transmitted reference signals for transmission to the network side.

In this way, there is provided an efficient way of managing reference signals in a wireless communication network. In particular, the performance of mobility procedures may be improved while maintaining low signaling overhead and/or low handover latency.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief system overview.

Figure 1:
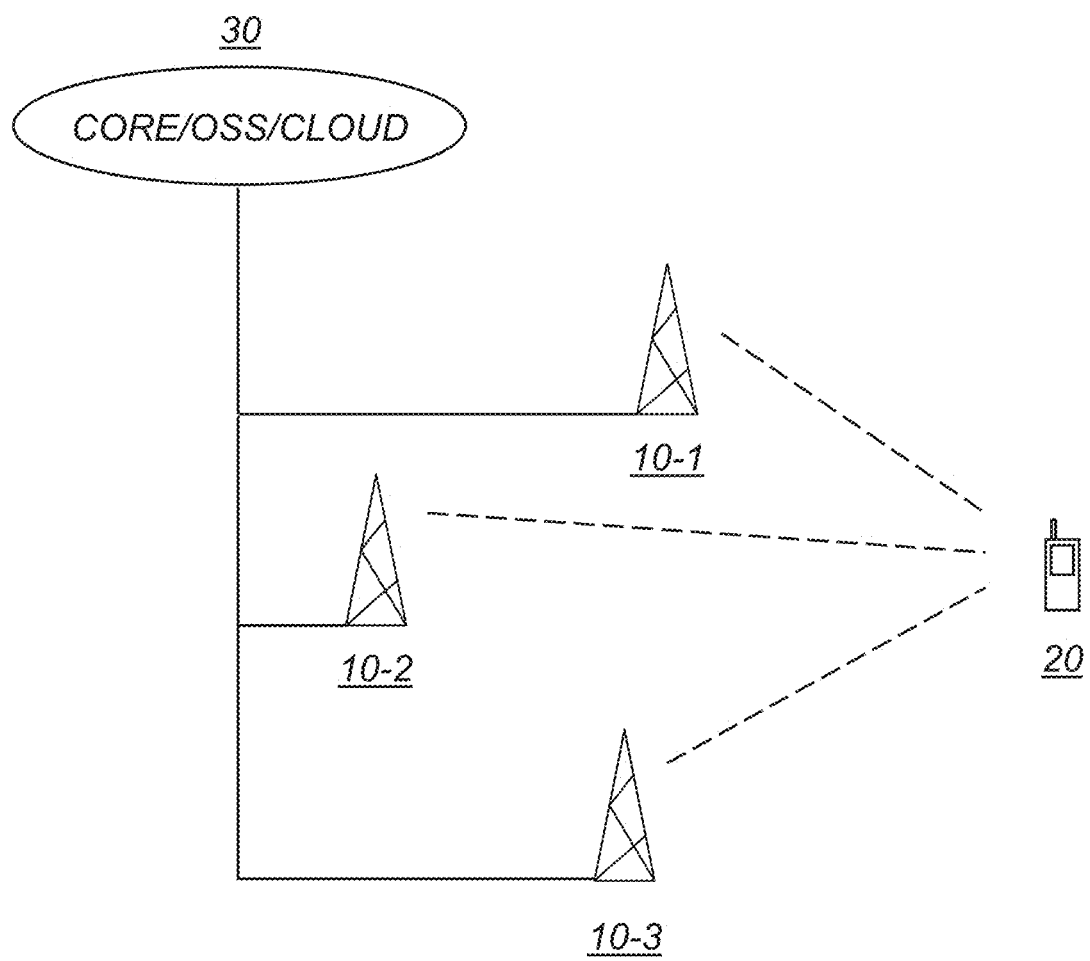
FIG. 1 is a schematic diagram illustrating an example of a wireless communication network.

FIG. 1 is a schematic diagram illustrating an example of a wireless communication network. The wireless communication network comprises network nodes 10-1, 10-2, 10-3 and one or more wireless communication devices 20. The network nodes 10-1, 10-2, 10-3 may be deployed as part of an access network with suitable connection to a core network, an Operations and Support System (OSS), and/or a cloud-based network environment 30, also referred to as the cloud.

By way of example, functionality relevant for the proposed technology may be implemented in one or more network nodes and/or wireless communication devices. Alternatively, or as a complement, such functionality may be at least partially implemented for execution in a core network node, an OSS device and/or in a cloud-based network device, with suitable transfer of information to/from network nodes and/or wireless communication devices in the access network.

As used herein, the term "network device" may refer to any device located in connection with a communication network, including but not limited to devices in access networks, core networks and similar network structures. The term network device may also encompass cloud-based network devices.

As used herein, the non-limiting term "network node" may refer to access nodes, base stations, access points, network control nodes such as network controllers, radio network controllers, base station controllers, access controllers, and the like. In particular, the term "access node" and/or "base station" may encompass different types of access devices or radio base stations including standardized base station functions such as Node Bs, or evolved Node Bs (eNBs), gNBs and also macro/micro/pica radio base stations, home base stations, also known as femto base stations, relay nodes, repeaters, radio access points, Base Transceiver Stations (BTSs), and even radio control nodes controlling one or more Remote Radio Units (RRUs), or the like.

As used herein, the term "user" may refer to User Equipment, UE, or any other wireless communication device adapted for operation in a wireless communication network.

As used herein, the non-limiting terms "wireless communication device" and "User Equipment (UE)" may for example refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As mentioned, it has been agreed that the transmission of so-called always-on signaling should be minimized in future wireless communication networks such as 5G networks. Always-on transmission of reference signals is not power efficient and introduces more interference in the network. It is therefore envisaged to employ a system design in which the transmission of reference signals is triggered on-demand, e.g. by activating the transmission of a reference signal when the quality of a current serving link is not good enough. However, the inventors have realized that this type of on-demand reference signals may introduce higher latency and increased configuration signaling, thereby resulting in higher risk for handover failure or radio link failure. Consequently, there are conflicting requirements and there is a need for an improved and viable solution.

Figure 2:
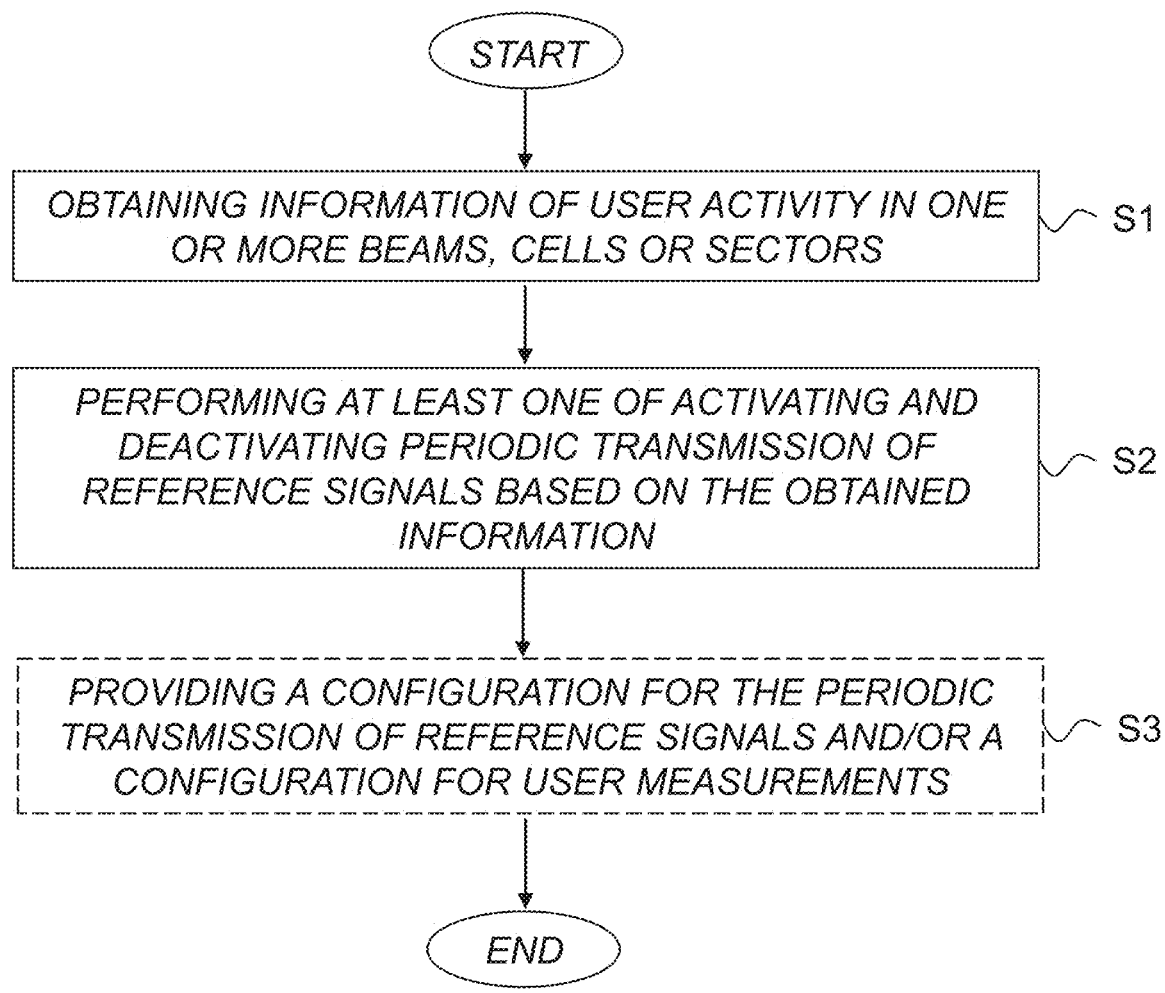
FIG. 2 is a schematic flow diagram illustrating an example of a method for selectively enabling periodic transmission of reference signals in a wireless communication network according to an embodiment.

FIG. 2 is a schematic flow diagram illustrating an example of a method for selectively enabling periodic transmission of reference signals in a wireless communication network according to an embodiment.

Basically, the method comprises:
S1: obtaining information of user activity in one or more beams, cells or sectors;
S2: performing at least one of activating and deactivating, for at least one beam, cell or sector, periodic transmission of reference signals based on the obtained information.

In this way, there is provided an efficient way of managing reference signals in a wireless communication network. In particular, the performance of mobility procedures may be improved while maintaining low signaling overhead and/or low handover latency.

As indicated in FIG. 2, the method may include the optional step S3 of providing at least one of a configuration for the periodic transmission of reference signals and a configuration for user measurements of periodically transmitted reference signals for at least one user, as will be exemplified later on.

With regard to the term "user activity" it should be understood that it may include any activity by one or more active users and/or the presence of one or more active users.

The term "active user" may for example refer to a user, which is in an active mode or state such as RRC_CONNECTED state and/or take part in the activity of transmitting and/or receiving signals.

For example, user activity may include the presence of a user in active mode or state such as RRC_CONNECTED state, the activity of transmitting and/or receiving signals in relation to an access node and/or user movement such as user mobility and/or repositioning of a user in terms of physical location. Thus, user activity may include "presence of an active user" irrespective of whether the user is moving or not.

Accordingly, the information of user activity may for example include information of at least one of the following: presence of active user(s), speed of active user(s), direction of movement of active user(s) and type of wireless communication service used by active user(s).

The information of user activity normally comprises information about active users within a considered geographical area or region.

In other words, periodic transmission of reference signals may be selectively activated/deactivated (switched on/off) in dependence on information about active user(s) in one or more beams/cells/sectors.

It should be understood that typically the selective activation/deactivation refers only to the periodic transmission of reference signals such as mobility reference signals. The transmitter or more generally transceiver of the network node responsible for periodic transmission of the reference signals may still be in a power-on state and continue transmitting and/or receiving data and/or other control signals. Accordingly, the proposed technology allows the periodic transmission of reference signals from a transmitter of a network node to be deactivated, while maintaining the transmitter in a power-on state. In this way, the proposed technology enables lean signaling, which results not only in energy efficiency but also low interference within the network. Compared to so-called green technology innovations for wireless communication networks, where the transceiver is turned off completely to save energy, the proposed technology suggests a mechanism to selectively activate/deactivate periodic transmission of reference signals based on information about user activity or active users.

Although the proposed technology is generally applicable to beams/cells/sectors, it should be understood that it is particularly useful when applied to beams in wireless communication networks operating based on beamforming technology.

Figure 3:
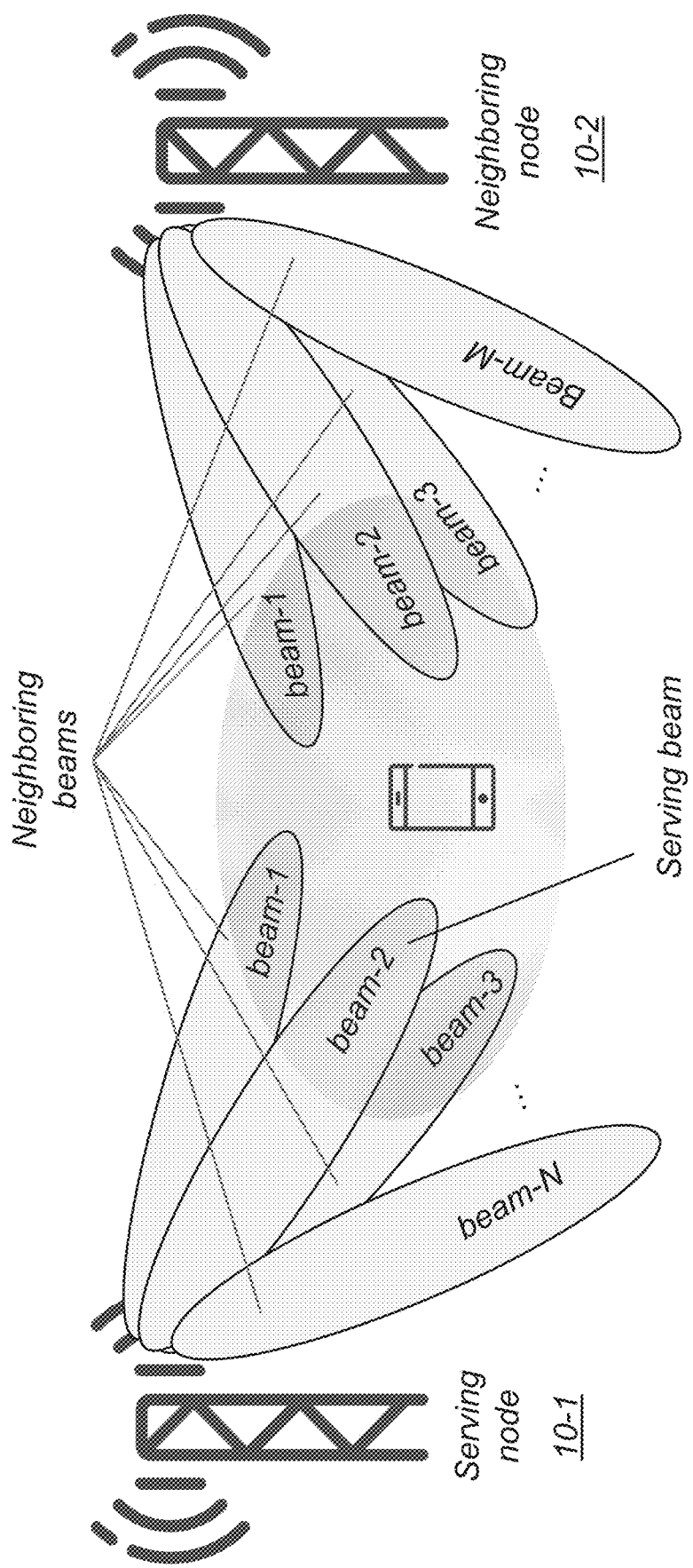
FIG. 3 is a schematic diagram illustrating an example of a wireless communication network comprising a serving network node and a neighbor network node, each capable of operating a number of beams for communication with one or more wireless communication devices.

FIG. 3 is a schematic diagram illustrating an example of a wireless communication network comprising a serving network node and a neighbor network node, each capable of operating a number of beams for communication with one or more wireless communication devices.

The serving network node 10-1 is capable of operating a number, N, of beams, beam-1, beam-2, beams-3, . . . , beam-N. A neighboring network node 10-2 is capable of operating a number, M, of beams, beam-1, beam-2, beams-3, . . . , beam-M. One or more of the beams of the serving network node is the so-called serving beam(s), and the serving beam may have a number of neighboring beams within a geographical area of interest. The neighboring beams may include intra-node neighboring beams (beams belonging to the same network node) and/or inter-node neighboring beams (beams belonging to different network nodes).

Depending on the radio conditions and other circumstances, it may be desirable to perform a handover from one beam to another beam, a so-called beam switch. Prior to such a beam switch, as part of the overall handover procedure, reference signals may be transmitted from the network nodes, and corresponding measurements on the reference signals may then be performed by the user(s) such as a UE or similar wireless communication device. Based on the measurements, suitable measurement reports may be generated and transmitted to the network side, where a handover decision can be taken based on the report(s). Such a handover decision can be taken by a network device or node in the access network, or by a suitable network device or node in the core network or even in the cloud. Based on the handover decision, a beam switch is performed in the access network, either a switch between beams of the same network node (intra-node beam switch) or a switch between beams of different network nodes (inter-node beam switch). The former case is less complicated, whereas the latter case is more complicated and complex. The considered user is also informed of the beam switch by means of a handover command.

Figure 4:
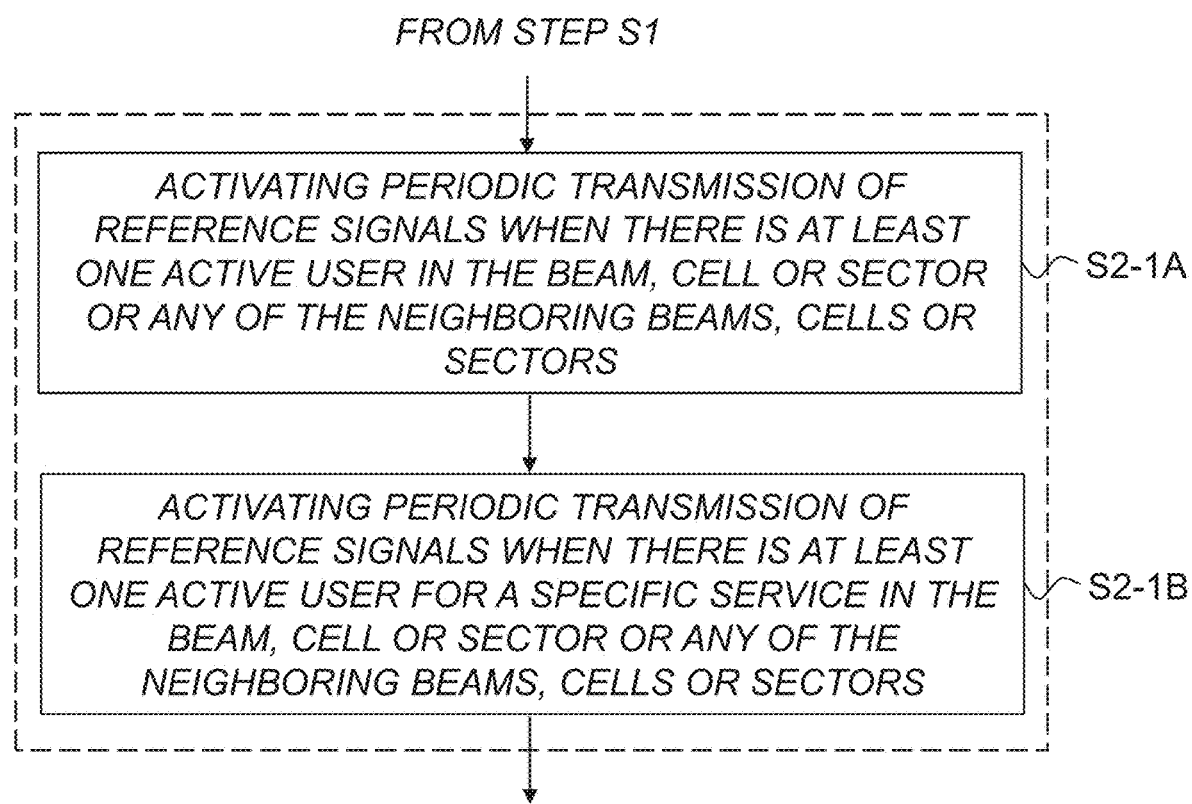
FIG. 4 is a schematic diagram illustrating an example of the step of performing at least one of activating and deactivating periodic transmission of reference signals according to an embodiment.

FIG. 4 is a schematic diagram illustrating an example of the step of performing at least one of activating and deactivating periodic transmission of reference signals according to an embodiment.

In this example, the step S2 of performing at least one of activating and deactivating periodic transmission of reference signals comprises:

S2-1A: activating the periodic transmission of reference signals for a beam, cell or sector when there is at least one active user in the beam, cell or sector or any of the neighboring beams, cells or sectors, or S2-1B: activating the periodic transmission of reference signals for a beam, cell or sector when there is at least one active user for a specific wireless communication service in the beam, cell or sector or any of the neighboring beams, cells or sectors.

Figure 5:
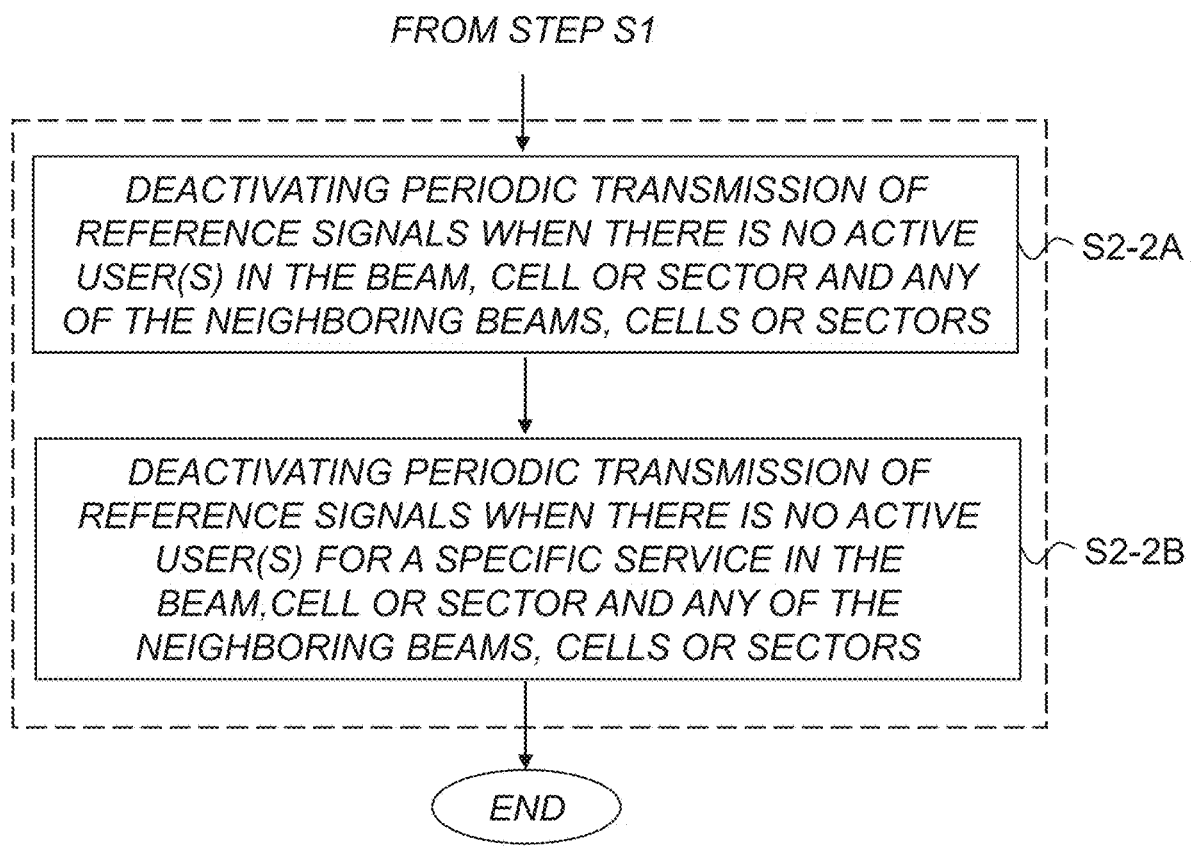
FIG. 5 is a schematic diagram illustrating another example of the step of performing at least one of activating and deactivating periodic transmission of reference signals according to an embodiment.

FIG. 5 is a schematic diagram illustrating another example of the step of performing at least one of activating and deactivating periodic transmission of reference signals according to an embodiment.

In this example, the step S2 of performing at least one of activating and deactivating periodic transmission of reference signals comprises:

S2-2A: deactivating the periodic transmission of reference signals for a beam, cell or sector when there is no active user(s) in the beam, cell or sector and any of the neighboring beams, cells or sectors, or S2-2B: deactivating the periodic transmission of reference signals for a beam, cell or sector when there is no active user(s) for a specific wireless communication service in the beam, cell or sector and any of the neighboring beams, cells or sectors.

Figure 6:
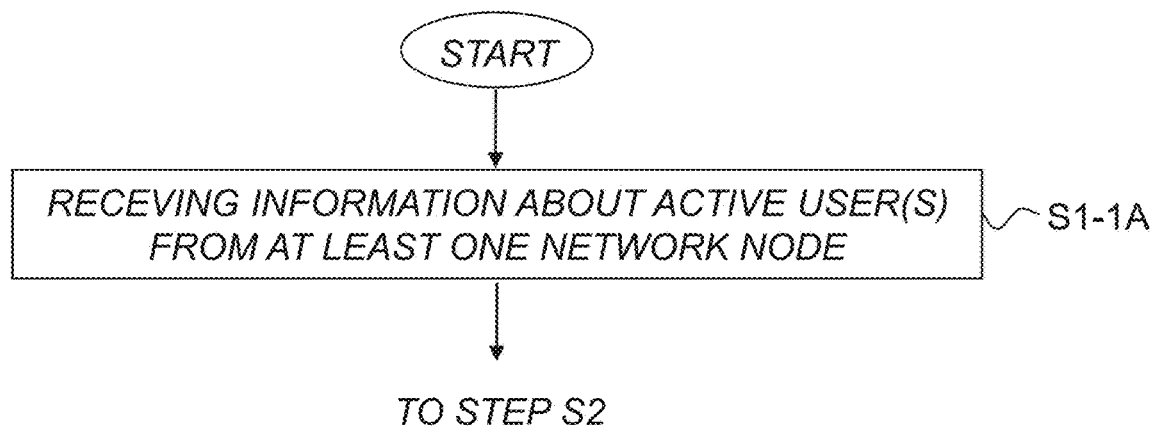
FIG. 6 is a schematic diagram illustrating an example of the step of obtaining information of user activity according to an embodiment.

FIG. 6 is a schematic diagram illustrating an example of the step of obtaining information of user activity according to an embodiment.

In this example, the step S1 of obtaining information of user activity comprises the step S1-1A of receiving information about active user(s) from at least one network node in the wireless communication network.

Figure 7:
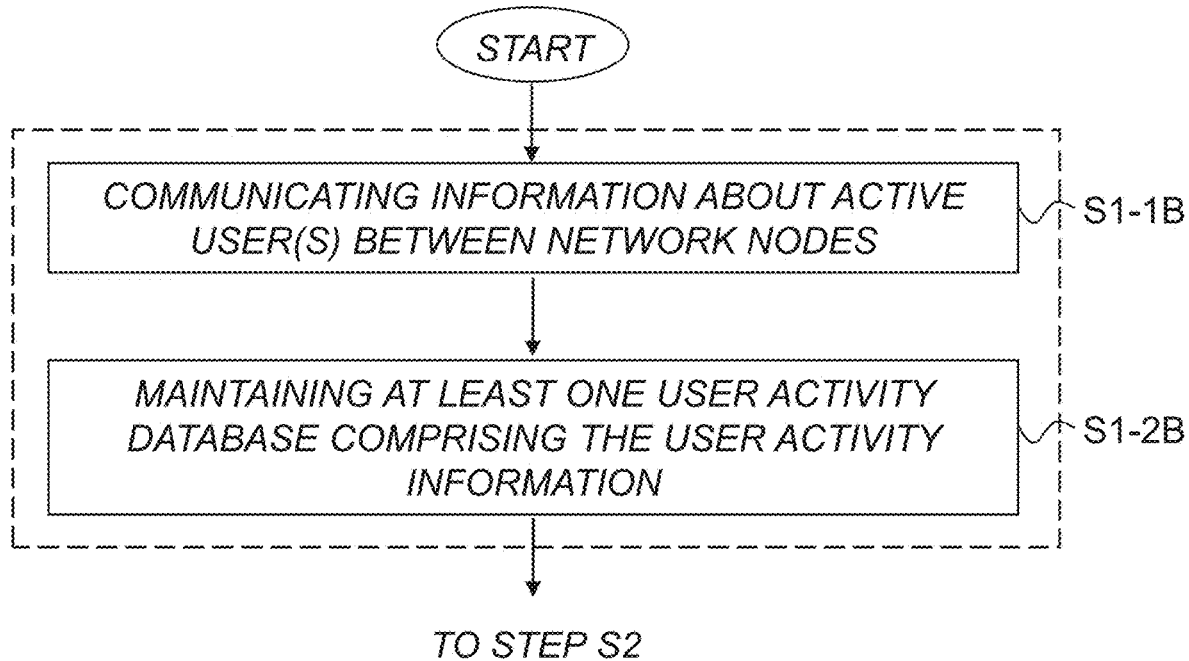
FIG. 7 is a schematic diagram illustrating another example of the step of obtaining information of user activity according to an embodiment.

FIG. 7 is a schematic diagram illustrating another example of the step of obtaining information of user activity according to an embodiment.

In this particular example, the step S1 of obtaining information of user activity comprises the step S1-1B of communicating information about active user(s) in one or more beams, cells or sectors between network nodes, and the step S1-2B of maintaining at least one user activity database comprising the user activity information.

By way of example, the information about active user(s) may be communicated between the network nodes and updated in the user activity database(s) in response to at least one of a mobility event and an event when a user arrives to or leaves the network.

As an example, a configuration for user measurements of reference signals may be provided based on the communicated information about active user(s).

Figure 8:
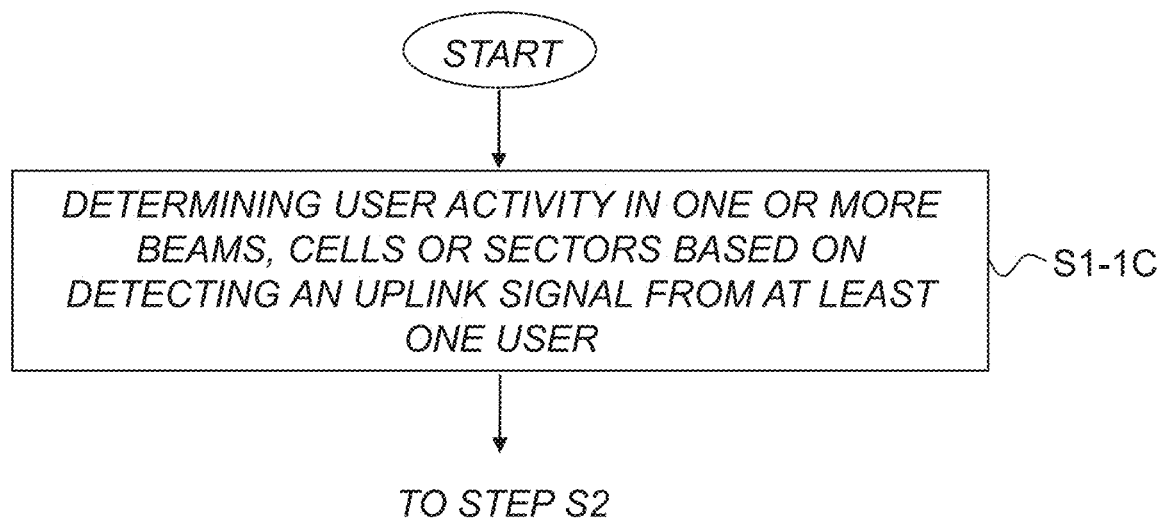
FIG. 8 is a schematic diagram illustrating yet another example of the step of obtaining information of user activity according to an embodiment.

FIG. 8 is a schematic diagram illustrating yet another example of the step of obtaining information of user activity according to an embodiment.

In this particular example, the step S1 of obtaining information of user activity comprises the step S1-1C of determining user activity in one or more beams, cells or sectors based on detecting an uplink signal from at least one user.

By way of example, the uplink signal may be detected based on at least one of received signal power and a specific preamble sequence.

For example, a specific uplink signal may be received and mapped to a specific beam and used as a trigger to initiate periodic transmission of reference signals in the specific beam and selectively also in one or more neighboring beams.

As an example, a configuration for the periodic transmission of reference signals may be provided based on at least one property of the detected uplink signal.

Similarly, a configuration for user measurements of reference signals may be provided based on at least one property of the detected uplink signal.

In the latter case, the configuration for user measurements of reference signals may define at least one of a search space of time/frequency transmission resources and timing for detection of the reference signals.

In the above examples, the at least one property of the detected uplink signal may include at least one of received signal energy, timing, direction of arrival, time/frequency transmission resources and code sequence of the uplink signal.

In a particular example embodiment, a reference signal identifier may be determined based on an identifier of a network node for transmitting the reference signal and an uplink signal identifier of the detected uplink signal.

Optionally, the step S2 of performing at least one of activating and deactivating periodic transmission of reference signals may include the step of communicating at least one transmission request between network nodes to activate transmission of reference signals for at least one neighboring beam, cell or sector.

Advantageously, the reference signals may be mobility reference signals and the method may be applied for beams.

As previously indicated, the periodic transmission of reference signals from a transmitter of a network node may be deactivated, while maintaining the transmitter in a power-on state.

By way of example, the method may be performed by a network device. For example, the network device may be implemented in a network node of the wireless communication network or the network device may be a cloud-based network device.

Figure 9:
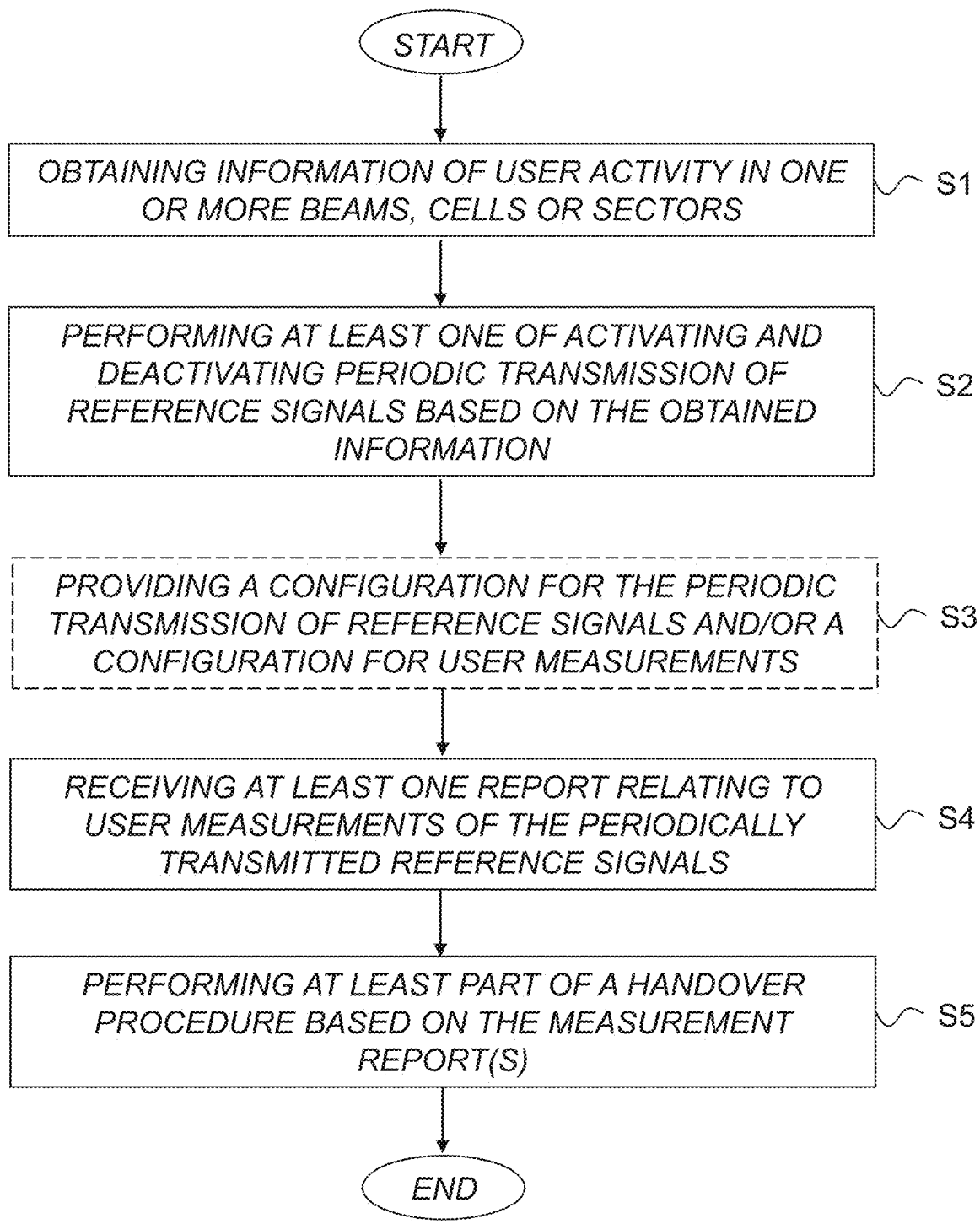
FIG. 9 is a schematic flow diagram illustrating an example of a method for performing handover between beams, cells or sectors according to an embodiment.

FIG. 9 is a schematic flow diagram illustrating an example of a method for performing handover between beams, cells or sectors according to an embodiment. The method for performing handover between beams, cells or sectors basically comprises the above-described method involving steps S1 and S2, and optionally step S3.

Further, the method of FIG. 9 may comprise the step S4 of receiving at least one report relating to user measurements of the periodically transmitted reference signals, and the step S5 of performing at least part of a handover procedure based on the measurement report(s).

For example, the method may comprise performing a beam switch procedure based on the measurement report(s).

Figure 10:
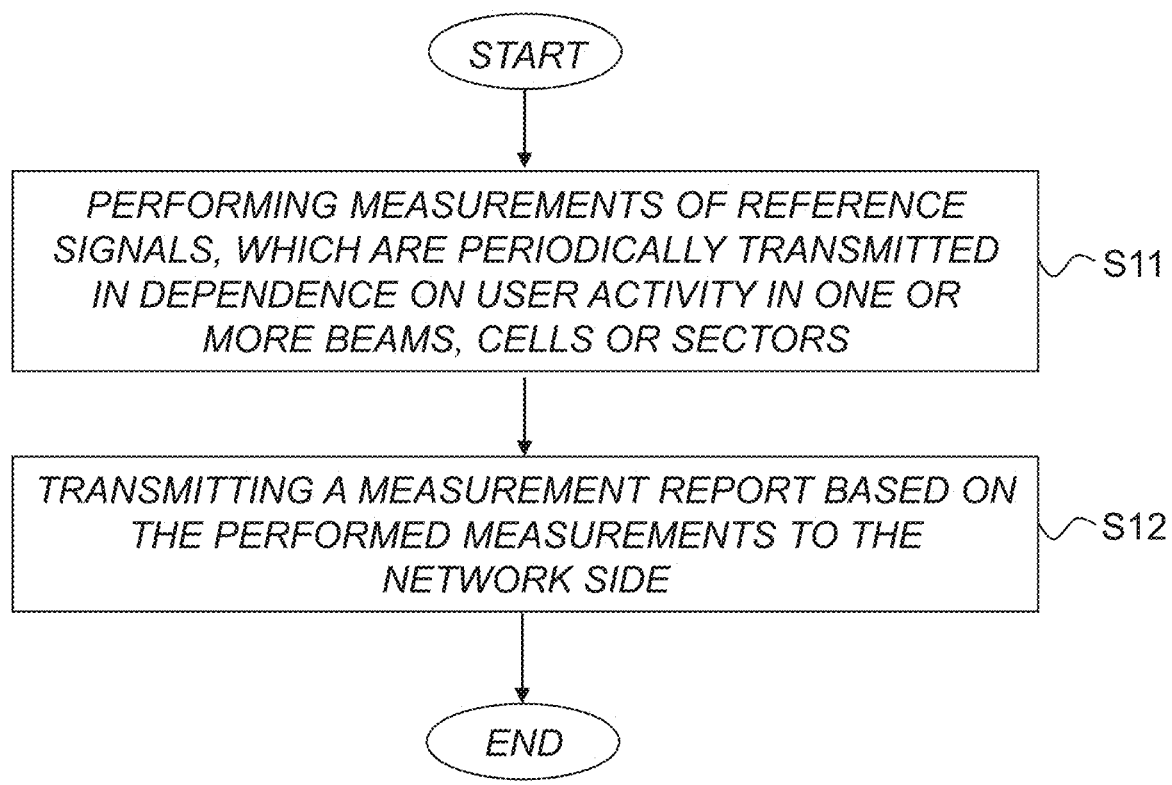
FIG. 10 is a schematic flow diagram illustrating an example of a method of operating a wireless communication device in a wireless communication network according to an embodiment.

FIG. 10 is a schematic flow diagram illustrating an example of a method of operating a wireless communication device in a wireless communication network according to an embodiment.

Basically, the method comprises:
S11: performing measurements of reference signals, which are periodically transmitted in dependence on user activity in one or more beams, cells or sectors;
S12: transmitting a measurement report based on the performed measurements to the network side.

Figure 11:
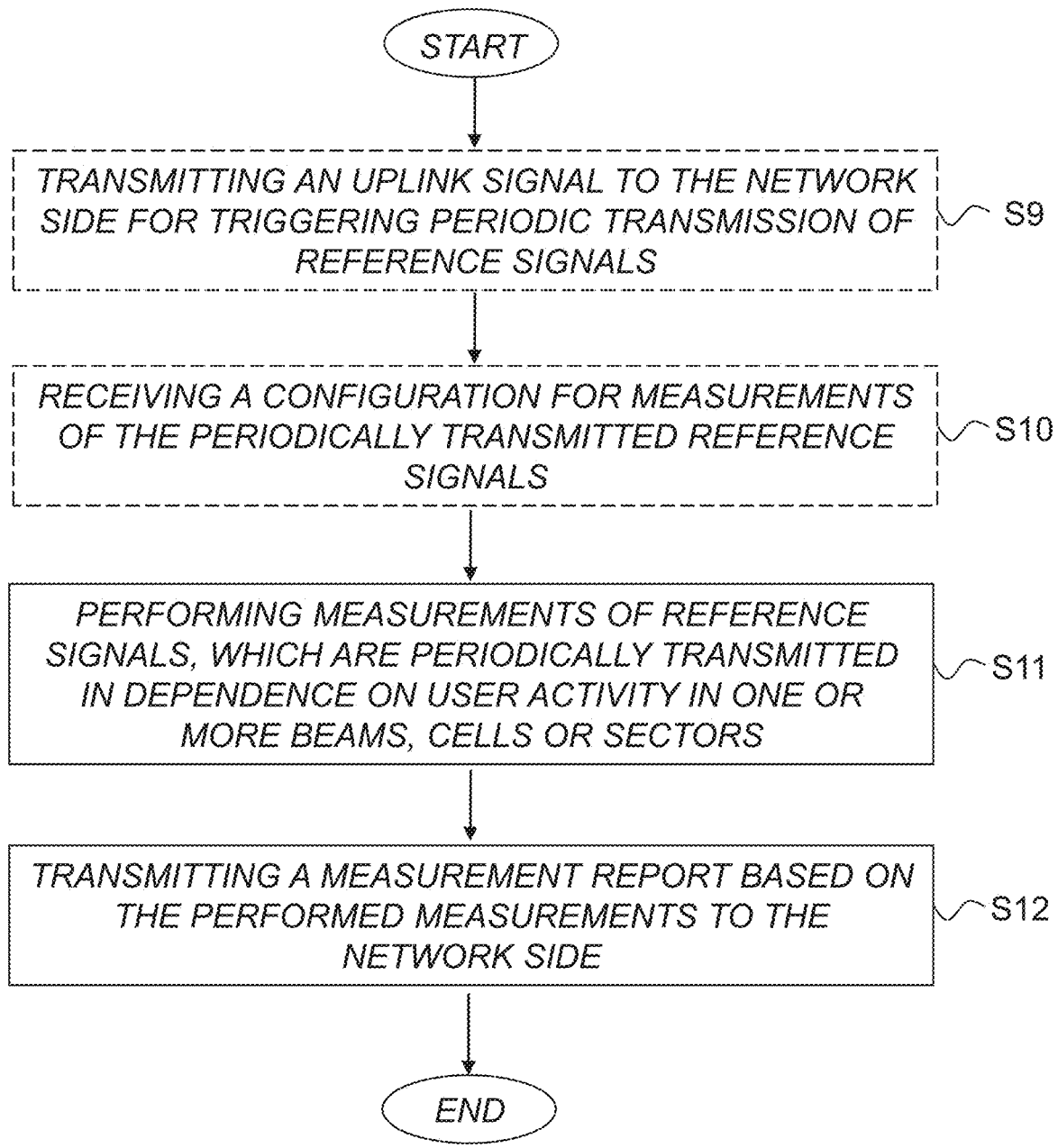
FIG. 11 is a schematic flow diagram illustrating another example of a method of operating a wireless communication device in a wireless communication network according to an embodiment.

FIG. 11 is a schematic flow diagram illustrating another example of a method of operating a wireless communication device in a wireless communication network according to an embodiment.

In this example, the method optionally comprises the step S9 of transmitting an uplink signal to the network side for triggering periodic transmission of the reference signals.

For example, a specific uplink signal may be transmitted to trigger periodic transmission of reference signals in a specific beam and selectively also in one or more neighboring beams. By way of example, a so-called Uplink Synchronization Signal, USS, may be used.

As an example, the USS may indicate a selected beam by the time slot in which the USS is transmitted (a typical USS sequence may be 1, 2 or 3 OFDM symbols long). To support this mode of indicating a specific beam, a number of time slots (e.g. with a length of 1, 2 or 3 OFDM symbols each) have been configured, each mapping towards one of the beams. In an alternative approach, the symbol sequence used in the USS indicates the selected beam through a preconfigured mapping between USS sequence and beam (e.g. between USS and measured beam reference signal).

A USS may consist e.g. of a symbol sequence that is similar (or equivalent) to a random access preamble, e.g. a Zadoff-Chu sequence, or some other sequence with good autocorrelation and cross-correlation properties.

Optionally, the method also comprises the step S10 of receiving a configuration for measurements of the periodically transmitted reference signals in one or more beams, cells or sectors. Thus, the step S11 of performing measurements of reference signals is performed according to the received configuration.

As an example, the configuration for measurements of the periodically transmitted reference signals is based on at least one property of the uplink signal.

For example, the at least one property of the uplink signal may include at least one of received signal energy, timing, direction of arrival, time/frequency transmission resources and code sequence of the uplink signal.

Normally, the transmitted measurement report enables a handover decision on the network side, and the method may thus comprise the steps of receiving a handover command from the network side and effectuating handover on the user side.

By way of example, the reference signals may be mobility reference signals and the method may be applied for beams.

In the following, the proposed technology will be described with reference to a number of non-limiting illustrative examples.

For a better understanding, it may be useful to start with a brief overview of an example of the current solution for LTE.

In LTE, the UE moves from one cell to another. An example of an active mode mobility procedure is illustrated in FIG. 12.

In this example, the UE measures the cell quality (usually based on the Reference Signal Received Power, RSRP, or the Reference Signal Received, RSRQ, metrics) of the serving cell and neighboring cells based on a Cell-specific Reference Signal, CRS. Depending on the type of the Radio Resource Control, RRC, measurement event, (e.g. when the neighbor cell quality is better than serving cell quality with a preconfigured offset), the UE will send a measurement report to the network. The CRS is always transmitted in all downlink sub-frames so that the UE can measure this signal at any time. The measurement report can be periodic and event-triggered. The network then according to this measurement report, knows which cell is the best cell. If the best cell is not the current serving cell, the network notifies UE to handover to the best cell, according to well-known standard procedures.

Figure 12:
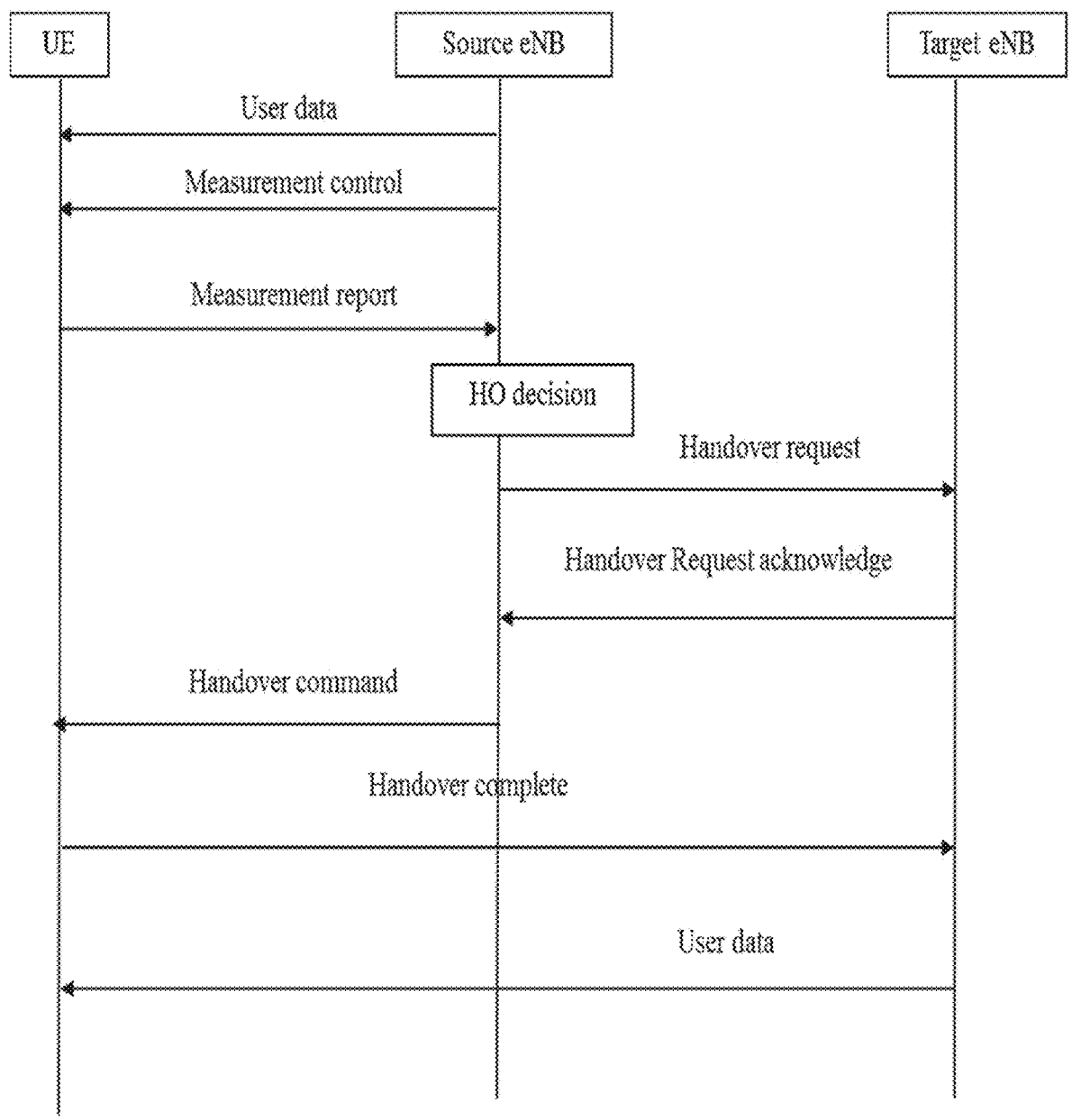
FIG. 12 is a schematic diagram illustrating an example of signaling and/or actions in connection with conventional handover in a Long Term Evolution, LTE, system.

The illustrated signaling procedure in FIG. 12 is relevant for both intra-eNB and inter-eNB handover events.

In 5G NR, there is no concept of mobility based on cells. Instead, the UE moves from beam to beam. In beamforming-based communication networks, it could be beneficial to avoid always-on signaling. As mentioned, in 3GPP, it has been agreed that the transmission of so-called always-on signaling should be minimized.

The UE measures the beam quality of serving beam and neighboring beams based on so-called Mobility Reference Signals, MRS. It should be understood that the proposed technology is not limited by any particular term or expression used for representing such reference signals. In the following, the terms "reference signal" and "Mobility Reference Signal, MRS" will be used interchangeably.

To reduce the overhead, the MRS should not always be transmitted unlike the CRS. It can be envisioned that the MRS is activated only when it is necessary. When several Access Nodes, AN, are involved in mobility measurements, each AN could send the specific MRSs on the relevant beams based on the current serving AN's request (sent via inter-AN signaling).

To reduce blind detection attempts, the network may inform the UE which MRSs to measure. The network can decide the best beam for the UE according to the corresponding measurement report(s). If the best beam is not the current serving beam, the network notifies the UE to switch to the best beam and starts to serve UE using that beam.

An initial assumption is thus to provide a solution in which the MRS is triggered on-demand, i.e. only when it is required. For example, when the quality of a current serving link is not good enough, the mobility procedure may be started by activating MRS transmission for UE measurements. The inventors have realized that this type of mobility procedure with on-demand MRS transmissions will introduce more latency and configuration signaling and result in more handover failure or radio link failure. This problem will bring more impact for services requiring low latency and high reliability. Also, it has a negative effect at high frequency band where channel quality may drop fast. In addition, on-demand MRS activation may not be optimal at new AN deployments until neighbor relations are established by other means. This will introduce a delay in the full utilization of a newly installed AN in a 5G network. There is also a concern that the configuration for MRS might increase the UE complexity and increase the signaling overhead.

Currently in LTE, for mobility, a reference signal is transmitted from each cell all the time as long as the cell is on, which causes considerable overhead and interference. The LTE mobility solution thus conflicts with the recently approved "lean" signaling principles in 5G. Therefore, straightforwardly incorporating such always-on reference signals from LTE into 5G will not work and will conflict with the recent agreements in 3GPP. A new type of mechanism is needed to resolve the aforementioned problems while preserving the "lean" signaling design in the 5G NR concept.

A basic idea according to the proposed technology is to selectively activate and/or deactivate, for at least one barn/ cell/sector, periodic transmission of reference signals based on information about of active user(s) in one or more beams, cells or sectors.

In a sense, the proposed technology enables activation and/or deactivation of periodic reference signals for mobility based on UE activity in a geographical area of interest.

By way of example, when there is active user(s) in a beam or any of its neighbor beams, the MRS in this beam may be transmitted with a coarse periodicity and be available for any UE measurements. If there is no active user(s) in a beam and any of its neighbor beams, the MRS transmission will be deactivated as long as there is no on-demand MRS activation requests. The UE may measure the MRS periodically and use it to apply mobility events (e.g. handover to another AN).

In a first example, the UE may receive optimized neighbor MRS detection/measurement/reporting instructions from the serving AN in a configuration message. These instructions can be sent to the UE either during or before a mobility event is triggered. The latter enables the UE to act fast without a large reconfiguration overhead once a new mobility event is triggered. The serving AN can acquire the knowledge about the active neighbor MRS beams/cells as well as request new MRS beam/cell activations from nearby neighbors. This knowledge base and activation process can be realized in the network over an inter-node connection interface by means of exchanging/updating/nurturing an active UE information table, sending periodic MRS activation requests, and receiving ACK/NACK responses. For example, the active user information in the network can be updated during a mobility event, or when a UE arrives or leaves the network.

In a second example, activation of periodic MRS can be triggered at neighbor beams/cells if and when an uplink signal is received from one or more UEs. The detection of such an uplink signal can be concluded at neighbor ANs, e.g. based on the received signal energy and/or a special UE-specific sequence and/or a special pattern of time/frequency resources. Once the detection is verified, the network node(s) of the neighbor beams/cells may activate and transmit periodic MRS. Some properties of these periodic MRS can be tailored based on the received uplink signal properties. For example, the UE's search space during the subsequent MRS detection can be optimized based on some of the properties of the uplink signal. These properties may include for example, a signature sequence, a direction-of-departure angle, a transmit beam width, a time-of-departure time reference, a time/frequency resource pattern and/or predefined rules.

Examples of one or more advantages of these example embodiments include:
  Improve the mobility procedure performance while maintaining low signaling overhead in 5G NR since MRS is transmitted only when there are active users in the close vicinity.
  Specifically, always-on periodic MRS is not power-efficient and introduces more interference in the network, and therefore conflicts with the lean signaling principles. On-demand MRS detection requires a large amount of signaling overhead with UE reconfiguration messages. On the other hand, the proposed solution optimizes the UE mobility procedure and reduces handover latency while maintaining low signaling overhead, low UE computational complexity, and high energy efficiency in the network.

In the following, further examples of various implementation aspects will be described, without loss of generality.

By way of example, during an active-mode mobility procedure, a serving AN may provide the UE with a reconfiguration message where details of the detection/measurement/reporting commands may be conveyed. These details can be defined based on some MRS-specific properties of each neighbor beam/cell, or can be defined more generally if the UE is expected to perform blind detection. For example, the served UE may be given some optimized detection/measurement/reporting instructions by the network where the activation/deactivation of the corresponding periodic MRSs from neighbor beams/cells should be managed based on the geographical UE dissemination of the network. Periodic MRS may be transmitted only when there is at least one active user in the considered beam or in at least one of the nearby neighbor beams/cells. If there is no active user in any of the nearby neighbor beams of a beam with no active users of its own, periodic MRS may be terminated for the beam. Based on the received reconfiguration message, the UE may initiate neighbor MRS measurements, e.g. with a certain periodicity. The measurement results can be reported to the serving AN according to the measurement configuration, for example until a certain number of reports are shared or until a certain measurement timer expires. If the measurement result suggests, for example, a beam switch event based on the UE's report to network, the beam switch may be triggered by the network with a handover signaling command.

As previously discussed, the proposed technology also discloses the alternative in which the activation of periodic MRS can be automated at the network node(s) of neighbor beams/cells in response to the reception (or detection) of an uplink signal. The deactivation could be triggered for the lack of detection or absence of the previously mentioned uplink signal. For example, the UE configuration for the consequent MRS detection can be embedded, either partially or wholly, in the uplink signal so that the search space during the UE's MRS detection can be optimized. This optimization will be particularly efficient for the case where a plurality of neighbor beams/cells detect the uplink signal signature and activate/transmit periodic MRS based on the implicitly indicated transmission properties. For instance, the uplink transmission timing can be used with a pre-defined offset as a reference for the activation of MRS detection attempts at the UE. In addition, the direction-of-arrival and beam width properties of the uplink signal can be used as a reference when forming the periodic MRS transmission from the neighbor beams/cells. This will help the network to be aware of the UE's relative location as well as its precision. This information serves as input for the network to decide what MRS to transmit relevant for a position or section of the whole coverage area of the access node in order to reduce power consumption and potential interference.

The signature sequence and the received power properties, for example, can be utilized for the detection of the uplink signal at nearby neighbor beams/cells. In order to prevent false detection and collisions in case of overlapping transmission from multiple UEs in time, the uplink sequences should have good autocorrelation properties and assigned uniquely for each UE.

For example, the proposed technology is particularly applicable to wireless networks employing high-gain beam-forming, where the candidate links are different beams that could be used for communicating with the UE. However, the principles are also applicable to more traditional, cell- and sector-based deployments. In some of the specific examples we may refer to beams. However, a beam should be viewed as simply an example of a link between a network node and a wireless communication device such as a UE, also commonly referred to as a user.

The idea can also be implemented only for a specific service instead of all services in a network, i.e., it may be applied only to active users benefiting from a specific service which requires low latency and/or high reliability.

Examples of possible implementation procedures of the proposed technology will be elaborated upon in the following.

Example—Information of Active User(s) Exchanged/Updated Between Neighbors

In one embodiment, the network nodes of neighbor beams/cells/sectors exchange/update the active user information, and trigger the MRS transmission among the neighbor beams/cells.

When there is an active user in one beam, the corresponding node will inform other neighbor nodes to transmit MRS and prepare for UE's measurement since the active user might move to a neighbor beam soon. When there is no active user, this information can also be informed to node(s) of the neighbor beams, and the node(s) of the neighbor beams can use this information as input to decide whether to deactivate or terminate the MRS transmission.

The information exchange among nodes of neighbor beams/cells and the triggering of a new MRS transmission may not necessarily be needed. For example, if an active set of neighbor MRS transmissions are considered sufficient for an intended mobility event or procedure, no new MRS activation may be requested by the serving beam/cell/sector. The decision on new MRS activation may be made after the active user information is updated. On the other hand, even if a new MRS activation request is made by the node responsible for the serving beam/cell, the request may be rejected via a NACK message from a neighbor node of a neighbor beam/cell due to insufficient antenna ports and/or due to a lack of available MRS IDs at the neighbor node. In such cases, the serving AN may configure the UE based on the currently available active MRS beams/cells without a new MRS activation from a node of the neighbor beam/cell.

A neighbor node can also periodically check with their neighbor node(s) for active user information to update its awareness about the nearby user/network activity. Such periodic check can be based on broadcasting, multicasting, or unicasting a request toward the node(s) of neighbor beams/cells over an inter-node (e.g between base stations) interface so that they can respond with up-to-date local information on their active users. This request may or may not happen during an ongoing mobility event. Also, this information may not necessarily be updated during every mobility procedure. Such an update on network awareness may also be triggered from the source of the change. For example, if a new UE establishes initial access to an AN, this AN may inform its neighbors about the updated UE presence or trigger a new awareness update at the neighbor ANs. In addition, the UE awareness of the network can also be improved over the air during initial random access. When a new UE transmits a random access preamble, the preamble may be received in multiple beams/cells. Hence, there may be awareness of the presence of the UE in multiple neighbor beams/cells even though the UE ends up establishing a connection with one of the neighbor beams/cells.

After an active user moves and switches to a new beam by handover, the network's awareness on the active UEs can be updated, which may trigger changes in the active set of MRS transmissions from neighbor beams/cells.

In a further sub-embodiment, how many and in which neighbor beams MRS transmission should be activated may also depend on the UE's speed, UE's velocity vector trajectory, and/or the network deployment. If the UE's speed is high and/or the beam width is narrow, more neighbor beams can be considered. If the UE's speed is low and/or the beam width is wide, less neighbor beams can be considered.

If the network is aware of the UE's movement direction, the neighbor beams can be updated proactively to be ready for a beam switch. Once the UE moves past its current location, the irrelevant neighbor beams behind the UE can be turned off and new neighbor beams in front of the UE can be activated.

Location-based historical data on past beam switch events can also be a determinant in a network for realizing the optimum number of active neighbor beams. If a radio link failure or a beam switch handover failure has occurred in the past due to the latency caused by insufficient neighbor beams, more neighbor beams can be activated during the next measurement event for a beam switch around the same location area. For example, the area in which neighbor beams are considered may be extended to cover a larger geographical region, thus including not only so-called first level neighbors but also second or higher level neighbors.

The activation of neighbor beams can also be triggered during a beam steering event. Instead of a beam switch, the network may first attempt steering the current serving beam toward the UE's geographical destination of direction. In that case, one approach can be to activate new neighbor beams while the current serving beam is steered. Another approach can be to steer the active neighbor beams as well along the current serving beam.

For a further sub-embodiment, only when the active user(s) in the system is/are user(s) with low latency or high reliable service, the periodical MRS transmission will be triggered. When the active user(s) is/are user(s) with other type of service(s), the on-demand MRS transmission can be used. For example, the activation and deactivation of such periodic MRS can be triggered only based on the location of the service-specific active users. However, once such periodic MRS transmission is activated in a beam, the network may preserve the usage only for the active users benefiting from the service or the network may permit all of the active users in the network to listen to those periodic MRS signals as long as they are activated.

In another embodiment, the network may configure the UE based on the up-to-date knowledge about the MRS activation status of neighbor beams/cells and/or the active UE awareness of the network.

When the MRS is active in some of the neighbor beams, this information (i.e., which MRS is turned on/off) can optionally be configured in the UE to let the UE know which MRS should be measured and how/when to measure. Alternatively, the network may also inform the UE about the awareness of other UEs. The latter can be realized in a restricted manner to ensure security and privacy.

The UE configuration can be provided either during or prior to a mobility procedure. The former configuration timing may require more signaling overhead on the radio, yet may be more suitable in a network with many high-mobility UEs. On the other hand, the latter configuration timing may cause less signaling overhead, but the network may need to verify whether the most recent configuration message received by the UE is up-to-date before triggering a new mobility procedure.

Figure 13:
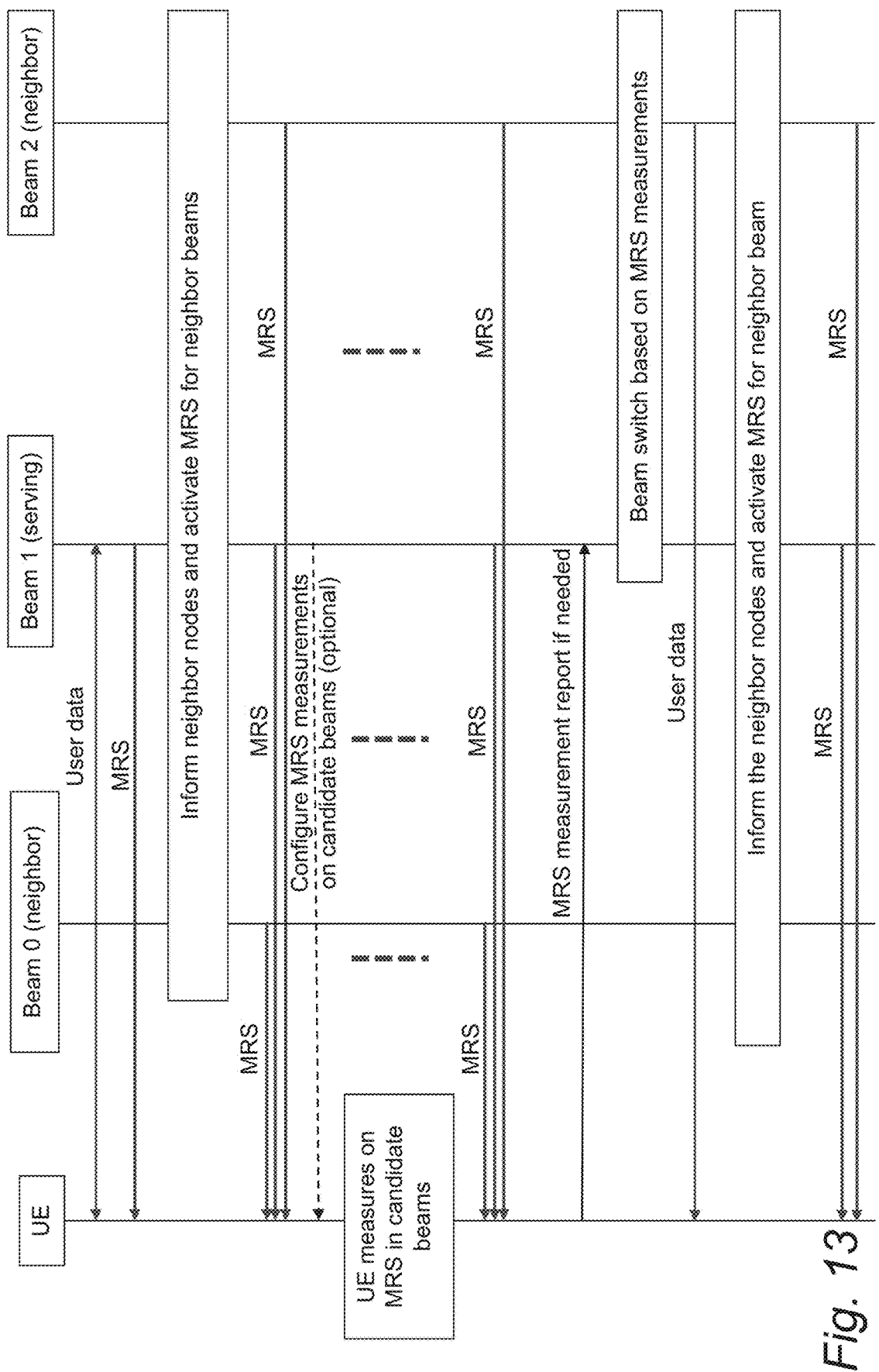
FIG. 13 is a schematic diagram illustrating an example of signaling and/or actions in connection with handover involving a beam switch procedure using information about active users according to an embodiment.
Figure 14:
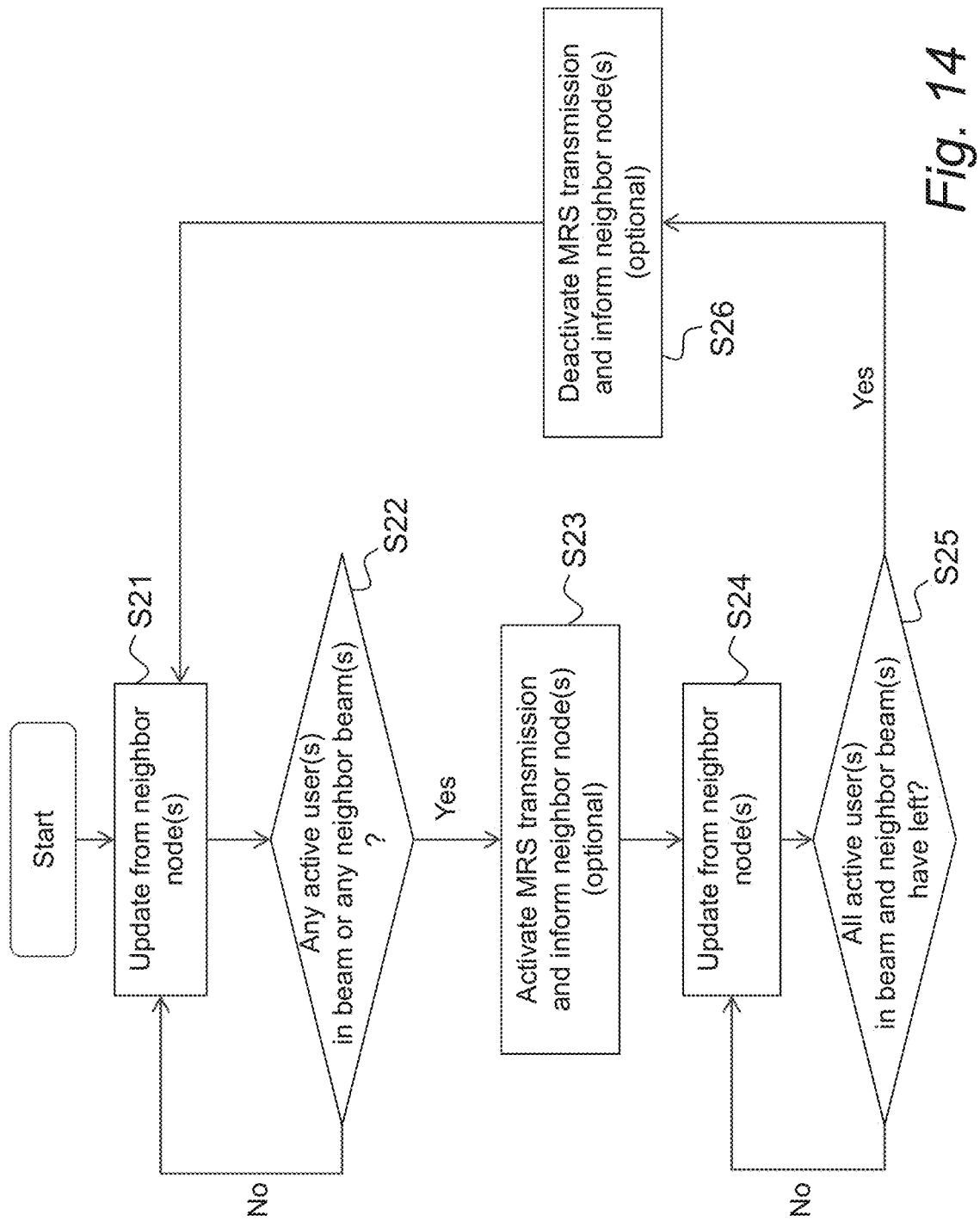
FIG. 14 is a schematic flow diagram illustrating an example of the process of activating and/or deactivating periodic transmission of mobility reference signals using information about active users according to an embodiment.

An example of the signaling is given in FIG. 13 and the flow chart in the network can be found in FIG. 14.

FIG. 13 is a schematic diagram illustrating an example of signaling and/or actions in connection with handover involving a beam switch procedure using information about active users according to an embodiment.

The MRS is periodically transmitted in active beams. When the UE moves to a new beam, MRS transmission is only activated in the serving beam and its neighbor beams for UE measurement(s). In the example of FIG. 13, the neighbor beams of beam 1 are beam 0 and beam 2. When the UE is served by beam 1, MRS from the severing beam (beam 1) and its neighbor beams (beam 0 and 2) will be transmitted periodically. Optionally, the transmitted MRS will be configured to the UE. The UE may then measure the MRS periodically. When the measurement result leads to a beam switch event, the UE will report to the network and the beam switch will be triggered after the network's decision. In the example of FIG. 13, it is assumed that beam 0 is not the neighbor beam of beam 2. When the UE switches from beam 1 to beam 2, there is no active user who needs to measure any MRS from beam 0. Hence, the MRS transmission in beam 0 will be deactivated while the MRS transmissions from beam 1 and 2 remain active.

FIG. 14 is a schematic flow diagram illustrating an example of the process of activating and/or deactivating periodic transmission of mobility reference signals using information about active users according to an embodiment. In step S21, there is an update from neighbor node(s). In step S22, it is checked whether there is/are any active user(s) in a beam or any of its neighbor beam(s). If NO, the procedure goes back to step S21. If YES, the procedure continues with step S23, in which MRS transmission is activated and optionally neighbor node(s) is/are informed. The considered node may also receive update(s) from neighbor node(s), as indicated in step S24. In step S25, it is checked whether all active user(s) in a beam and the neighbor Beam(s) have left. If NO, the procedure goes back to step S24. If YES, the procedure continues with step S26, in which the MRS transmission is deactivated and optionally neighbor node(s) is/are informed.

Example—Uplink Signal Detection

In another embodiment, the MRS can be activated and transmitted after an uplink signal is detected in one or more of the considered beams. By way of example, the detection of the uplink signal can be determined based on the received signal energy and/or a specific code sequence.

Due to the directional reciprocity principle, if an uplink signal is transmitted from a UE and detected by an AN with a fixed beam in uplink, it is expected that the downlink transmission from the same beam will also arrive at the same UE. If a signal is detected in one beam in uplink, it means that there is at least one active user in the direction of that beam, or in one of its neighbor beams in case of high UE mobility during the duplex timing gap. Hence, MRS transmission should be activated in those beams. Regarding the beams which do not detect such a signal in the uplink, it means that there is no active user in the beam or its neighbor beams, therefore MRS transmission is not required in those beams.

In a sub-embodiment, the uplink signal can be detected and identified based for example, on the signal energy and/or a specific code sequence.

For example, the detection of such an uplink signal can be realized based on a specific code sequence. The signature sequence may need to have good autocorrelation properties and provide orthogonality among other sequences in the set. The latter may be useful when multiple UEs transmit such uplink signals. The network may assign unique sequences for each UE and therefore the node(s) of neighbor beams/ cells can detect the sequences with low interference. The signal energy may also be needed to prevent false detection occurrences. If the received energy in uplink is low, the neighbor beams/cells may not be triggered for MRS activation.

In another embodiment, the subsequent MRS detection at the UE after an uplink-based MRS activation can be configured based on the properties of the transmitted uplink triggering signal.

The detection timing at the UE may for example be based on the uplink transmission time plus a pre-defined timing offset. The search space over the time-frequency air resources can be minimized based on a matching between the uplink signature sequence and a pre-defined pattern. The measurement window at UE can be adjusted incrementally if no MRS is detected during the first attempt.

In a further embodiment, the transmission of the activated MRS in response to an uplink signal can be configured based on the signal energy, time of arrival, direction of arrival and/or a specific code sequence of the uplink signal.

Signal Energy Detection

For the signal energy, if the detected energy is larger than a threshold, it is considered that there is an active user in the considered area (the area covered by one or more neighbor beams and/or its own beam), the MRS will be activated and transmitted periodically. If the detected energy of one beam is smaller than another threshold, it is assumed that there is no active user in the considered area, and the MRS in the beam can be deactivated or terminated.

The detected energy can be filtered over a time or it can be a measurement sample. The variation of the detected energy can also be considered as input. For example, if the detected energy is increasing, this can be interpreted as a situation in which one or more user(s) is approaching or moving towards the beam.

The thresholds can be adapted and updated. If there is misdetection of the active user, the threshold can be decreased. If there is too much false alarm, the threshold can be increased. The false alarm can be confirmed with information exchange among the nodes of the neighbor beams. For example, if the detected energy is larger than the threshold, however there is no any active user in the neighbor beam, it can be regarded as the false alarm.

The threshold can be different in different deployment areas. For an area where the UE's moving speed could be high, a low threshold can be set.

The threshold can be coordinated among several nodes/ beams and informed among those nodes/beams.

Different services might require different mobility requirements. If different services are allocated in different subcarriers, and if this kind of subcarrier information is exchanged among the neighbor nodes/beams, the threshold could be measured in the specific sub-carrier(s) which is/are allocated to a specific service.

Time/Direction of Arrival Detection

For direction of arrival detection, if the uplink signal is transmitted from the UE omni-directionally, the signal may be detected in uplink by multiple beams at the AN. In that case, the beam detecting the strongest uplink energy may not accurately identify the UE's location due to a shadowing effect in another beam. If the uplink signal is transmitted via a narrow beam from the UE, beam misalignment may also cause inaccuracies in detecting the UE's location. Hence, the accurate direction of arrival may need to be derived algorithmically in addition to detection by received signal energy.

For time of arrival detection, the periodic MRS can be transmitted after a specific amount of time once the uplink signal is received, e.g., a fixed number of slots. Hence, the UE may know when to expect these MRS. Such time-to-trigger parameter for MRS activation can also compensate for the propagation delay over the air, since that delay is reciprocal.

Sequence Detection

For the sequence detection, if a sequence is detected in the uplink of a beam, it is considered as a situation in which there is an active user in the considered area (the area covered by one or more neighbor beams and/or its own beam), the MRS will be activated and transmitted. If there is no sequence detected in uplink in a beam for a period of time, it is assumed that there is no active user in the area, and the MRS in the beam can be deactivated or terminated.

The UE in the active mode is required to send a sequence. The sequence can be preconfigured or informed from the neighbor nodes/beams. The sequence could be different for different services.

Figure 15:
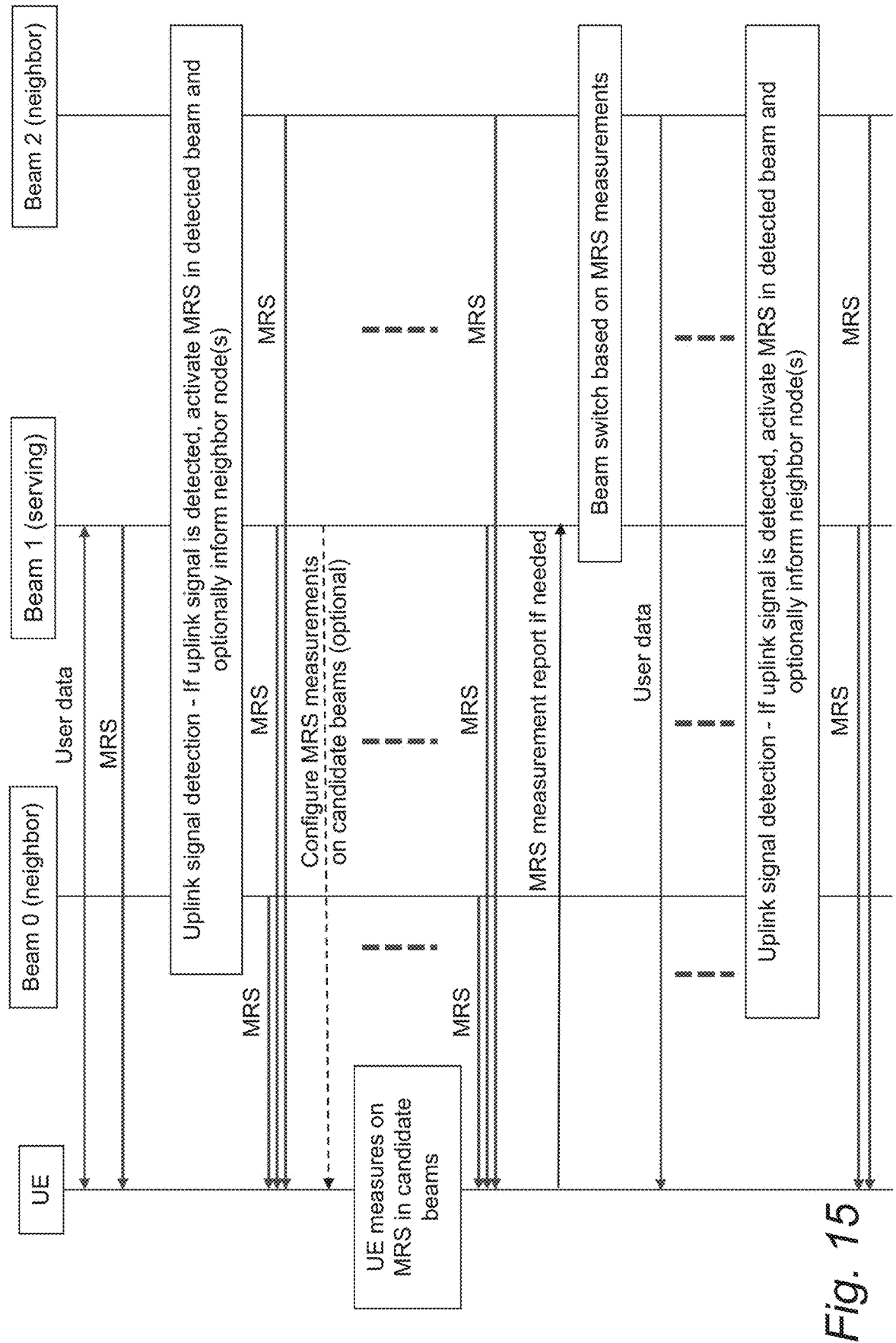
FIG. 15 is a schematic diagram illustrating another example of signaling and/or actions in connection with handover involving a beam switch procedure using information about active users according to an alternative embodiment.
Figure 16:
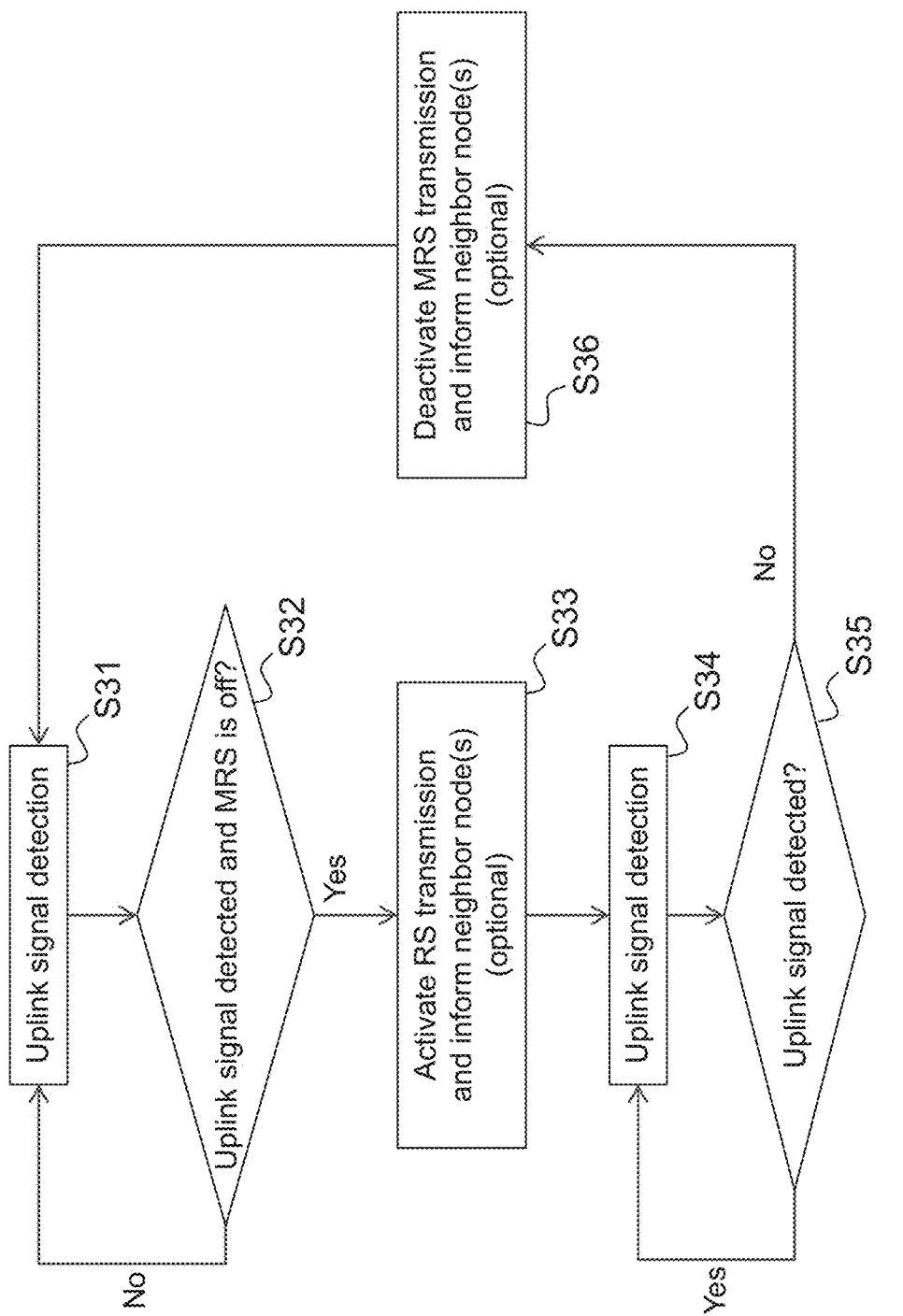
FIG. 16 is a schematic flow diagram illustrating another example of the process of activating and/or deactivating periodic transmission of mobility reference signals using information about active users according to an alternative embodiment.

An example of the signaling is given in FIG. 15 and the flow chart in the network can be found in FIG. 16.

FIG. 15 is a schematic diagram illustrating another example of signaling and/or actions in connection with handover involving a beam switch procedure using information about active users according to an alternative embodiment.

The procedure illustrated in FIG. 15 is similar to that of FIG. 13 except that the selective activation and/or deactivation of periodic MRS transmission depends on whether an uplink signal is detected.

FIG. 16 is a schematic flow diagram illustrating another example of the process of activating and/or deactivating periodic transmission of mobility reference signals using information about active users according to an alternative embodiment.

In step S31, uplink signal detection is performed. In step S32, it is checked whether an uplink signal is detected and MRS transmission is off. If NO, the procedure goes back to step S31. If YES, the procedure continues with step S33, in which MRS transmission is activated and optionally neighbor node(s) is/are informed. The procedure continues with uplink signal detection in step S34. In step S35, it is checked whether an uplink signal is detected. If YES, the procedure goes back to step S34 in which continued uplink signal detection is performed. If NO, the procedure continues with step S36, in which the MRS transmission is deactivated and optionally neighbor node(s) is/are informed.

Unique MRS Transmission within Proximity

Once MRS signals need to be transmitted from multiple nodes within some proximity, it may be necessary to ensure that that are no MRS conflict issues, i.e. that different nodes transmit different MRS to a UE. Otherwise, either the measurement results at the UE will be inaccurate or the handover decision made by network may be incorrect.

When there are inter-node interface connections between neighboring nodes, these network nodes can communicate with each other how each of them will transmit MRS and then solve the conflict. However, it may be required to resolve the issue when there are no inter-node interface connections between neighboring nodes.

By way of example, as each network node has a unique network node ID (something similar to Global eNB ID in LTE), when a network node needs to transmit MRS, it can convert its network node ID into a MRS ID. For example, assuming the digital number of the network node ID is 24 bits while the digital number of MRS ID is 10 bits, then the MRS ID to be transmitted by network node may be defined as the 10 rightmost bits of network node ID. If more than one MRS needs be transmitted due to multiple UEs requesting different beams, then the other MRS IDs can be adjacent numbers of the first selected MRS ID. If the network node can detect the signature of uplink signal, the MRS ID to be transmitted can also be a function of both network node ID and the uplink signature ID. As the uplink signatures from different UEs are different, it is thereby possible to transmit different MRS for different UEs from the same network node.

Figure 17:
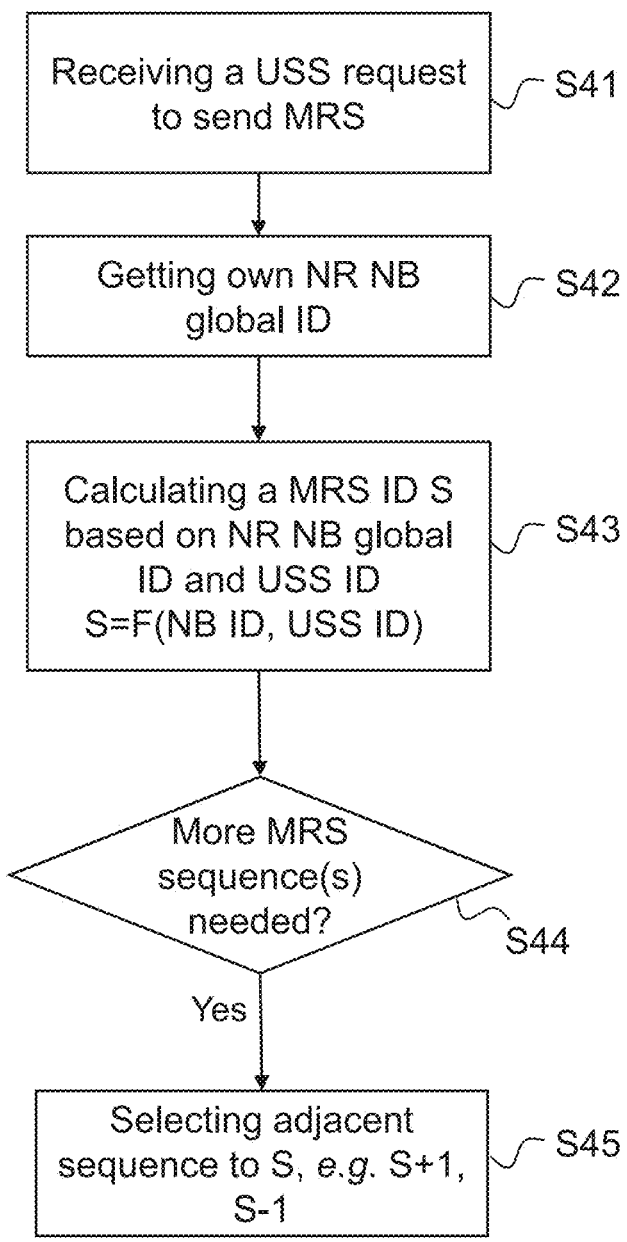
FIG. 17 is a schematic diagram illustrating a particular example of the process of determining a reference signal identifier according to an embodiment.

FIG. 17 is a schematic diagram illustrating a particular example of the process of determining a reference signal identifier according to an embodiment. In this example, there is illustrated a procedure at NR NB to generate a MRS sequence according to own NR ID and USS ID from UE.

Step S41 includes receiving a USS request to send MRS. Step S42 includes the network node getting its own NR NB global ID.

Step S43 includes calculating a MRS ID denoted S as a function f based on NR NB global ID and USS ID:

$$S=f(NB\ ID, USS\ ID).$$

Step S44 includes checking whether more MRS sequence (s) is/are needed, and if so to select an adjacent sequence to S, e.g. S+1 or S−1, as indicated in step S45.

Although it is not guaranteed to fully avoid MRS collisions using the above method, the confliction rate can be minimized significantly using the above method.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g by reprogramming of the existing software or by adding new software components.

According to an aspect of the proposed technology there is provided a network device configured for operation in connection with a wireless communication network. The network device may be configured to obtain information of user activity in one or more beams, cells or sectors. The network device may also be configured to perform at least one of activation and deactivation, for at least one beam, cell or sector, of periodic transmission of reference signals based on the obtained information. By way of example, the network device may be configured to operate based on information of user activity that includes information of at least one of: presence of active user(s), speed of active user(s), direction of movement of active user(s) and type of wireless communication service used by active user(s).

In a particular example,
  the network device is configured to activate transmission of reference signals for a beam, cell or sector when there is at least one active user in the beam, cell or sector or any of the neighboring beams, cells or sectors, or
  the network device is configured to activate transmission of reference signals for a beam, cell or sector when there is at least one active user for a specific wireless communication service in the beam, cell or sector or any of the neighboring beams, cells or sectors.

In another particular example, as a complement or an alternative,
  the network device is configured to deactivate transmission of reference signals for a beam, cell or sector when there is no active user(s) in the beam, cell or sector and any of the neighboring beams, cells or sectors, or
  the network device is configured to deactivate transmission of reference signals for a beam, cell or sector when there is no active user(s) for a specific wireless communication service in the beam, cell or sector and any of the neighboring beams, cells or sectors.

The network device may for example be configured to obtain the information of user activity based on receiving information about active user(s) from at least one network node in the wireless communication network.

As an example, the network device is configured to obtain the information of user activity based on communication of information about active user(s) in one or more beams, cells or sectors between network nodes, and to maintain at least one user activity database comprising the user activity information.

In another example, as a complement or an alternative, the network device may be configured to obtain the information of user activity based on detecting an uplink signal from at least one user in one or more beams, cells or sectors.

The network device may also be configured to perform at least one of activation and deactivation of periodic transmission of reference signals based on communicating at least one request between network nodes to activate transmission of reference signals for at least one neighboring beam, cell or sector.

Optionally, the network device may be configured to provide at least one of a configuration for the periodic transmission of reference signals and a configuration for user measurements of periodically transmitted reference signals for at least one user.

It should be understood that the network device is normally configured to deactivate the periodic transmission of reference signals from a transmitter of a network node, while maintaining the transmitter in a power-on state.

By way of example, the network device may be implemented in a network node of the wireless communication network or the network device may be a cloud-based network device.

Figure 18:
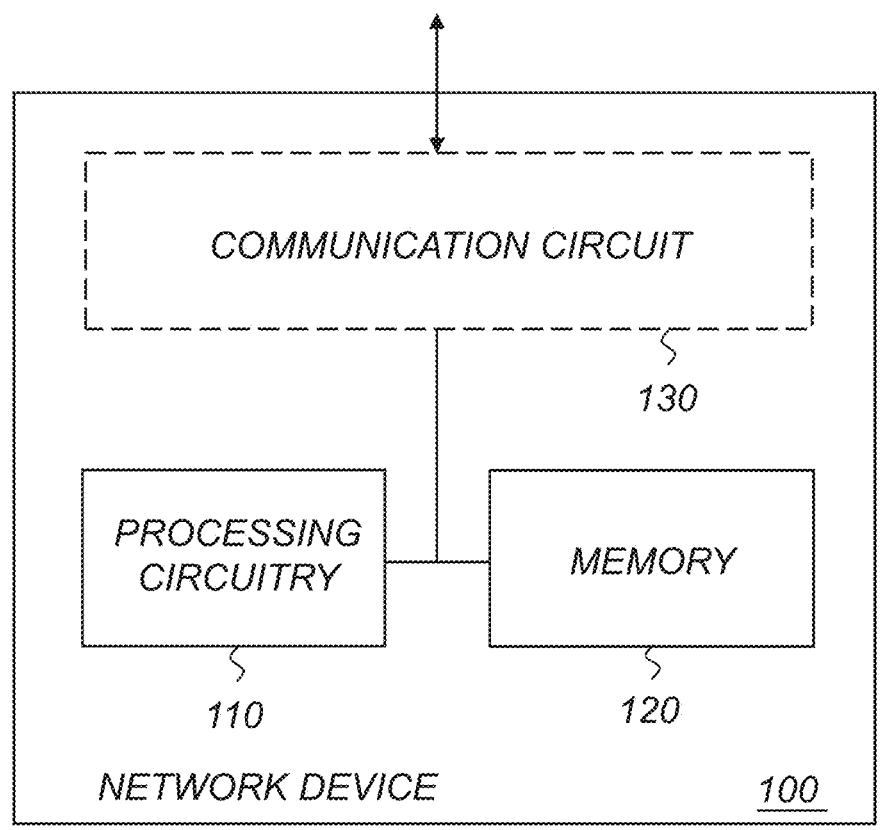
FIG. 18 is a schematic block diagram illustrating an example of a network device according to an embodiment.

FIG. 18 is a schematic block diagram illustrating an example of a network device according to an embodiment.

In this particular example, the network device 100 comprises processing circuitry 110 and memory 120, the memory 120 comprising instructions, which when executed by the processing circuitry, cause the network device 100 to obtain information of user activity and perform at least one of activation and deactivation of periodic transmission of reference signals based on the obtained information.

Optionally, the network device 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information such as reference signals, information about active user(s), user configurations and/or measurement reports. The communication circuit 130 may be interconnected to the processing circuitry 110 and/or memory 120. By way of example, the communication circuit 130 may include any of the following: a receiver, a transmitter, a transceiver, input/output (I/O) circuitry, input port(s) and/or output port(s).

By way of example, the processing circuitry 110 and/or the communication circuit 130 may be configured to perform the operations, functions and/or actions specified in steps S1, S2 and optionally S3 as described above for enabling selective activation/deactivation of periodic transmission of reference signals.

For example, the communication circuit may 130 be operated to receive information about active user(s) from at least one network node in the wireless communication network and/or to detect an uplink signal from at least one user in one or more beams, cells or sectors in order to obtain information of user activity (corresponding to step S1). From the perspective of the processing circuitry 110, this information may be read and used as input for deciding whether to activate and/or deactivate periodic transmission of reference signals (corresponding to step S2).

Optionally, the processing circuitry 110 may also be configured to provide a configuration for the periodic transmission of reference signals and/or a configuration for user measurements of periodically transmitted reference signals for at least one user (corresponding to step S3).

The configuration for the periodic transmission of reference signals may then be used by the communication circuit 130 when transmitting the reference signals.

The configuration for user measurements of periodically transmitted reference signals may be transmitted to a selected user by the communication circuit 130.

In another example, the processing circuitry 110 and/or the communication circuit 130 may be configured to perform the operations, functions and/or actions specified in steps S1 and S2, optionally step S3, and further steps of S4 and S5 as described above for enabling handover.

The steps S1, S2 and/or S3 may be implemented, e.g. as described above.

The communication circuit 130 may be operated to receive at least one report relating to user measurements of the periodically transmitted reference signals (corresponding to step S4). From the perspective of the processing circuitry 110, the report(s) is/are read and used as input for taking a handover decision and preparing suitable handover signaling for transmission by the communication circuit 130. In this way, relevant part(s) of a handover procedure such as a beam switch procedure is performed based on the measurement report(s) (corresponding to step S5).

As mentioned, the network device may be implemented in a network node, and thus there is provided a network node comprising the network device as described herein. By way of example, the network node may be an access network node such as the network node 10 shown in FIG. 1, but may alternatively be a network node in the core network or even in the operations and support system of the network.

For example, the network node may be configured to perform handover between beams, cells or sectors.

According to another aspect of the proposed technology there is provided a wireless communication device configured for operation in a wireless communication network. The wireless communication device is configured to perform measurements of reference signals, which are periodically transmitted in dependence on user activity in one or more beams, cells or sectors. The wireless communication device is further configured to transmit a measurement report based on the performed measurements to the network side.

Optionally, the wireless communication device is configured to transmit an uplink signal to the network side for triggering periodic transmission of the reference signals.

By way of example, the wireless communication device may be configured to receive a configuration for measurements of the periodically transmitted reference signals in one or more beams, cells or sectors, and to perform the measurements of reference signals according to the received configuration.

Figure 19:
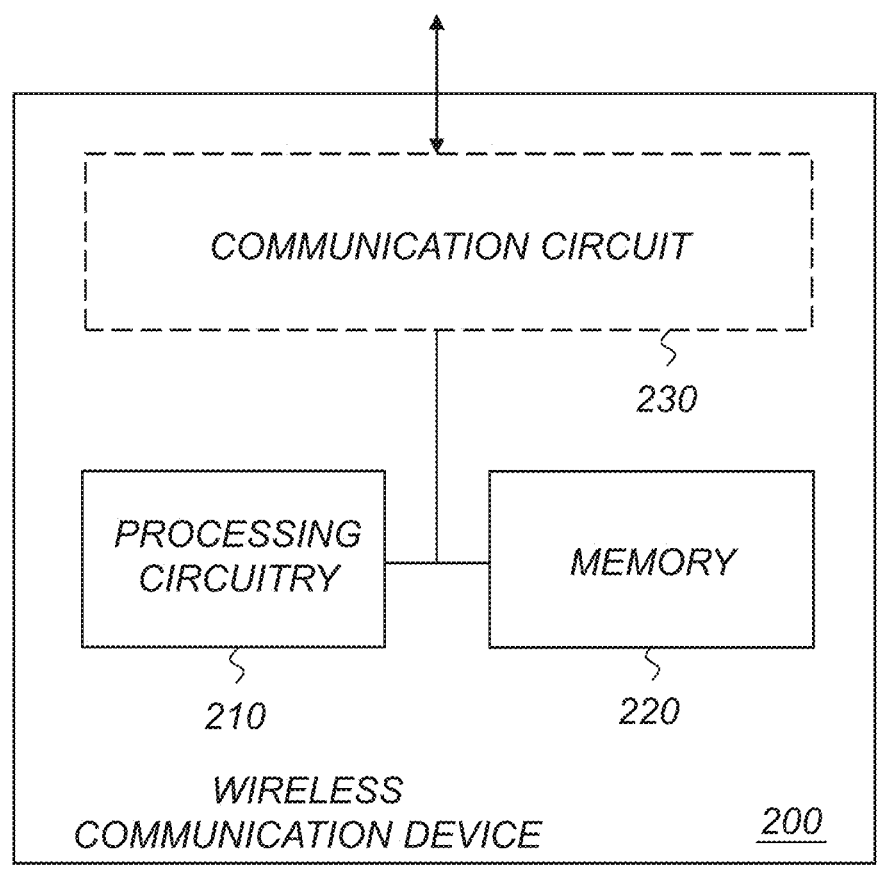
FIG. 19 is a schematic block diagram illustrating an example of a wireless communication device according to an embodiment.

FIG. 19 is a schematic block diagram illustrating an example of a wireless communication device according to an embodiment.

The wireless communication device 200 comprises processing circuitry 210 and memory 220, the memory 220 comprising instructions, which when executed by the processing circuitry 210, cause the wireless communication device 200 to perform measurements of reference signals and transmit a measurement report.

Optionally, the wireless communication device 200 may also include a communication circuit 230. The communication circuit 230 may include functions for wireless communication with other devices and/or network nodes in the network.

By way of example, the processing circuitry 210 and/or the communication circuit 230 may be configured to perform the operations, functions and/or actions specified in steps S11, S12 and optionally S9 and S10 as described above for operating the wireless communication device in a wireless communication network.

For example, the communication circuit may 230 be operated to receive the periodically transmitted reference signals, and the processing circuity 210 is configured to support and/or perform measurements on the received reference signals (corresponding to step S11). The processing circuitry 210 may also be configured to prepare a measurement report based on the performed measurements, and the report is transmitted to the network side by the communication circuit 230 (corresponding to step S12).

Optionally, the communication circuit 230 may be operated to transmit an uplink signal to the network side for triggering periodic transmission of reference signals (corresponding to step S9) and/or receive a configuration for measurements of the periodically transmitted reference signals (corresponding to step S10).

It is also possible to provide a solution based on a combination of hardware and software. The actual hardware-software partitioning can be decided by a system designer based on a number of factors including processing speed, cost of implementation and other requirements.

Figure 20:
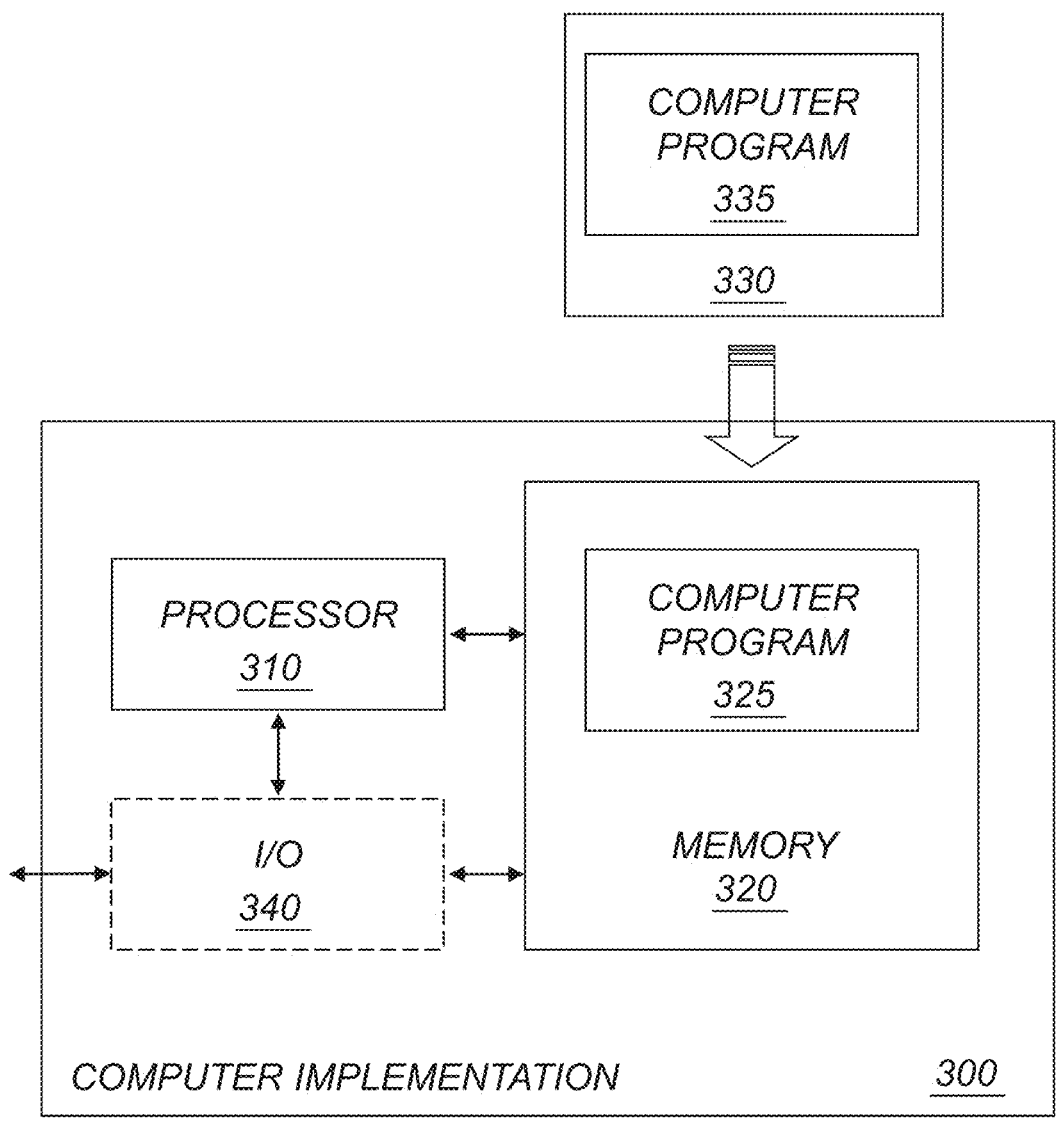
FIG. 20 is a schematic block diagram illustrating an example of a computer implementation according to an embodiment.

FIG. 20 is a schematic diagram illustrating an example of a computer-implementation 300 according to an embodiment. In this particular example, at least some of the steps, functions, procedures, modules and/or blocks described herein are implemented in a computer program 325; 335, which is loaded into the memory 320 for execution by processing circuitry including one or more processors 310. The processor(s) 310 and memory 320 are interconnected to each other to enable normal software execution. An optional input/output device 340 may also be interconnected to the processor(s) 310 and/or the memory 320 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 310 is thus configured to perform, when executing the computer program 325, well-defined processing tasks such as those described herein.

The processing circuitry does not have to be dedicated to only execute the above-described steps, functions, procedure and/or blocks, but may also execute other tasks.

In a particular example, the computer program 325; 335 comprises instructions, which when executed by at least one processor 310, cause the processor(s) 310 to:

obtain information of user activity in one or more beams, cells or sectors; and perform at least one of activation and deactivation, for at least one beam, cell or sector, of periodic transmission of reference signals based on the obtained information.

In another particular example, the computer program 325; 335 comprises instructions, which when executed by at least one processor 310, cause the processor(s) 310 to:

initiate measurements of reference signals, which are periodically transmitted in dependence on user activity in one or more beams, cells or sectors; and prepare a measurement report based on the measurements of the periodically transmitted reference signals for transmission to the network side.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 325; 335 may be realized as a computer program product, which is normally carried or stored on a computer-readable medium 320; 330, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HOD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 21:
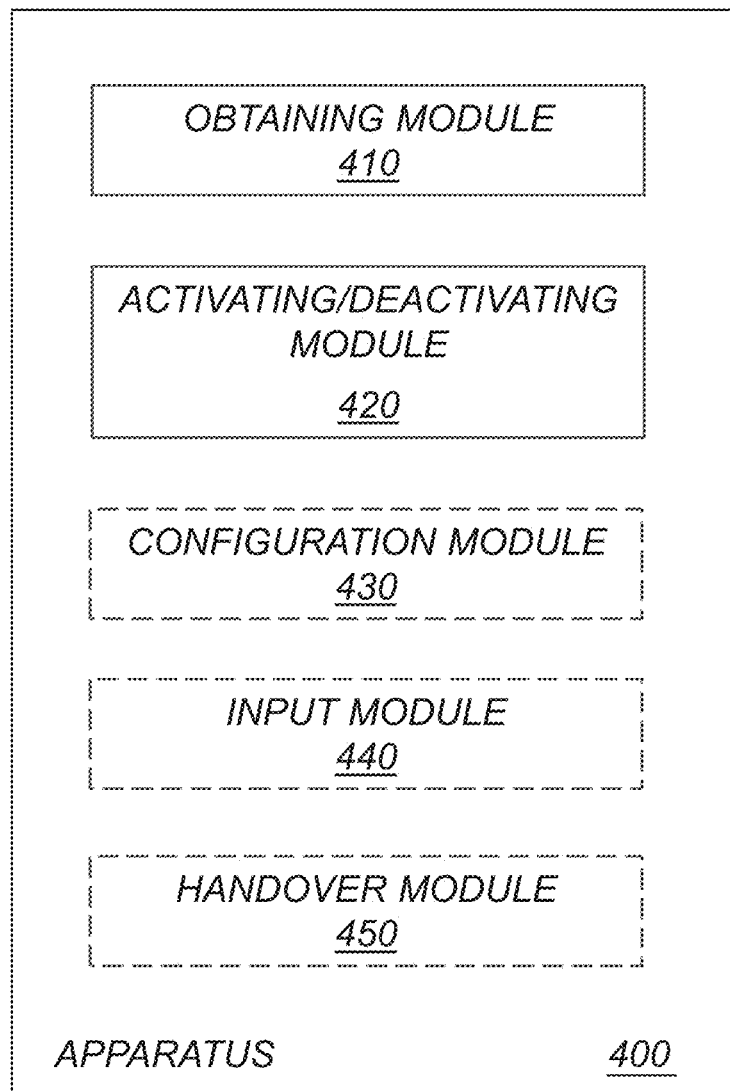
FIG. 21 is a schematic block diagram illustrating an example of an apparatus for selectively enabling transmission of reference signals according to an embodiment.

FIG. 21 is a schematic block diagram illustrating an example of an apparatus for selectively enabling transmission of reference signals according to an embodiment. Basically, the apparatus 400 comprises:

an obtaining module 410 for obtaining information of user activity in one or more beams, cells or sectors; and an activating/deactivating module 420 for performing at least one of activating and deactivating, for at least one beam, cell or sector, of periodic transmission of reference signals based on the obtained information.

It should be understood that the obtaining module 410 and/or activating/deactivating module 420 may perform any of the above-described steps of obtaining and/or activating/deactivating.

Optionally, the apparatus 400 may further comprise a configuration module 430 for providing a configuration for the periodic transmission of reference signals and/or a configuration for user measurements of periodically transmitted reference signals for at least one user.

Optionally, the apparatus 400 may also comprise an input module 440 for receiving at least one report relating to user measurements of the periodically transmitted reference signals, and a handover module 450 for performing at least part of a handover procedure based on the measurement report(s).

Figure 22:
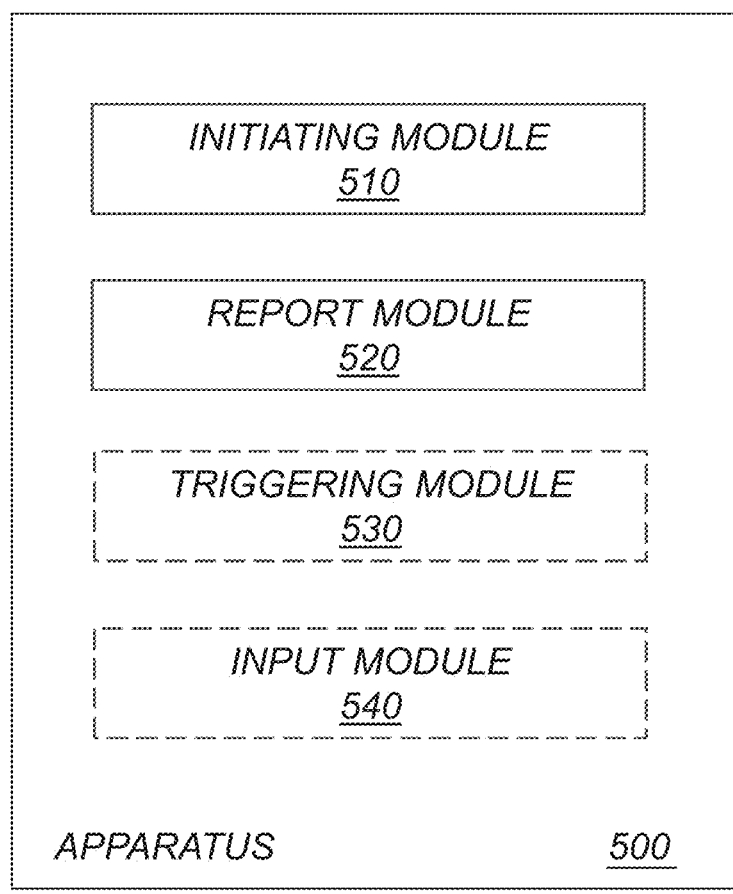
FIG. 22 is a schematic block diagram illustrating an example of an apparatus for handling measurements of reference signals according to an embodiment.

FIG. 22 is a schematic block diagram illustrating an example of an apparatus for handling measurements of reference signals according to an embodiment. Basically, the apparatus 500 comprises:

an initiating module 510 for initiating measurements of reference signals, which are periodically transmitted in dependence on user activity in one or more beams, cells or sectors; and a report module 520 for preparing a measurement report based on the measurements of the periodically transmitted reference signals for transmission to the network side.

Optionally, the apparatus 500 comprises a triggering module 530 for initiating transmission of an uplink signal to the network side for triggering periodic transmission of the reference signals.

In another optional embodiment, the apparatus 500 may also comprise an input module 540 for receiving a configuration for the measurements of the periodically transmitted reference signals.

Alternatively it is possible to realize the module(s) in FIGS. 21 and 22 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A network device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a UM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method performed by a network device of a wireless communication network, the method comprising:
   selectively turning periodic transmission of a Mobility Reference Signal (MRS) on or off for a given beam direction, among a plurality of beam directions used by a radio network node of the wireless communication network for providing radio coverage to user equipments in corresponding beam coverage areas;
   wherein the method includes turning off the periodic MRS transmission for the given beam direction in response to determining the absence of user activity in the given beam direction and determining the absence of user activity in any of one or more related beam directions, wherein each related beam direction is related to the given beam direction by having a corresponding beam coverage area neighboring the corresponding beam coverage area of the given beam direction;
   wherein the method further includes turning on the periodic MRS transmission for the given beam direction in response to either of determining the presence of user activity in the given beam direction or determining the presence of user activity in any of the one or more related beam directions; and
   wherein determining the presence or absence of user activity for each related beam direction that is associated with a neighboring radio network node is based on signaling transmitted by the neighboring radio network node that indicates a user-activity detection status for the each related beam direction, as determined by the neighboring radio network node.

2. The method of claim 1, further comprising, in response to turning on the periodic MRS transmission for the given beam direction, transmitting or initiating the transmission of, for each related beam direction that is associated with a neighboring radio network node, signaling for the neighboring radio network node that indicates a positive user-activity detection status for the given beam direction.

3. The method of claim 1, further comprising, in response to turning off the periodic MRS transmission for the given beam direction, transmitting or initiating the transmission of, for each related beam direction that is associated with a neighboring radio network node inter-node, signaling for the neighboring radio network node that indicates a negative user-activity detection status for the given beam direction.

4. The method of claim 1, wherein determining the absence of user activity in the given beam direction comprises determining that the radio network node has not detected any uplink-signal transmissions for the given beam direction, for a defined period.

5. The method of claim 1, further comprising, for a User Equipment (UE) that is active in the given beam direction and being served by the radio network node, transmitting or initiating the transmission of measurement configuration information for the UE, to provide the UE with information about the MRSs being periodically transmitted for the one or more related beam directions.

6. The method of claim 1, further comprising leaving an associated transmitter of the radio network node in a power-on state when selectively turning periodic MRS transmission on or off for the given beam direction.

7. A network device configured for operation in a wireless communication network, the network device comprising:
   memory storing program instructions; and
   processing circuitry that, based on executing the stored program instructions, is configured to:
   selectively turn periodic transmission of a Mobility Reference Signal (MRS) on or off for a given beam direction, among a plurality of beam directions used by a radio network node of the wireless communication network for providing radio coverage to user equipments in corresponding beam coverage areas;
   wherein the processing circuitry is configured to turn off the periodic MRS transmission for the given beam direction in response to determining the absence of user activity in the given beam direction and determining the absence of user activity in any of one or more related beam directions, wherein each related beam direction is related to the given beam direction by having a corresponding beam coverage area neighboring the corresponding beam coverage area of the given beam direction;

wherein the processing circuitry is configured to turn on the periodic MRS transmission for the given beam direction in response to either of determining the presence of user activity in the given beam direction or determining the presence of user activity in any of the one or more related beam directions; and wherein the processing circuitry is configured to determine the presence or absence of user activity for each related beam direction that is associated with a neighboring radio network node from signaling from the neighboring radio network node that indicates a user-activity detection status for the each related beam direction, as determined by the neighboring radio network node.

8. The network device of claim 7, wherein, in response to turning on the periodic MRS transmission for the given beam direction, the processing circuitry is configured to transmit or initiate the transmission of, for each related beam direction that is associated with a neighboring radio network node, signaling for the neighboring radio network node that indicates a positive user-activity detection status for the given beam direction.

9. The network device of claim 7, wherein, in response to turning off the periodic MRS transmission for the given beam direction, the processing circuitry is configured to transmit or initiate the transmission of, for each related beam direction that is associated with a neighboring radio network node inter-node, signaling for the neighboring radio network node that indicates a negative user-activity detection status for the given beam direction.

10. The network device of claim 7, wherein the processing circuitry is configured to determine the absence of user activity in the given beam direction based on determining that the radio network node has not detected any uplink-signal transmissions for the given beam direction, for a defined period.

11. The network device of claim 7, wherein, for a User Equipment (UE) that is active in the given beam direction and being served by the radio network node, the processing circuitry is configured to transmit or initiate the transmission of measurement configuration information for the UE, to provide the UE with information about the MRSs being periodically transmitted for the one or more related beam directions.

12. The network device of claim 7, wherein the network device comprises part of the radio network node and wherein, with respect to any related beam direction that is associated with a neighboring radio network node, the network device is configured to exchange user-activity detection status information with the neighboring network node via inter-node signaling, for use in determining when to turn on and turn off the periodic MRS transmission for the given beam direction.

13. The network device of claim 7, wherein the processing circuitry is configured to leave an associated transmitter of the radio network node in a power-on state when selectively turning periodic MRS transmission on or off for the given beam direction.

\* \* \* \* \*